(12) United States Patent
Takayama et al.

(10) Patent No.: US 9,791,194 B2
(45) Date of Patent: Oct. 17, 2017

(54) AIR-CONDITIONING APPARATUS

(75) Inventors: Keisuke Takayama, Tokyo (JP); Koji Azuma, Tokyo (JP); Yuji Motomura, Tokyo (JP); Takeshi Hatomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 503 days.

(21) Appl. No.: 14/358,323

(22) PCT Filed: Nov. 18, 2011

(86) PCT No.: PCT/JP2011/006432
§ 371 (c)(1),
(2), (4) Date: May 15, 2014

(87) PCT Pub. No.: WO2013/072969
PCT Pub. Date: May 23, 2013

(65) Prior Publication Data
US 2014/0318163 A1 Oct. 30, 2014

(51) Int. Cl.
*F25B 49/00* (2006.01)
*F25B 13/00* (2006.01)
(Continued)

(52) U.S. Cl.
CPC .............. *F25B 49/00* (2013.01); *F25B 13/00* (2013.01); *F25B 25/005* (2013.01); *F25B 49/02* (2013.01);
(Continued)

(58) Field of Classification Search
CPC ........ F25B 49/00; F25B 25/005; F25B 13/00; F25B 49/02; F25B 2313/0312;
(Continued)

(56) References Cited

U.S. PATENT DOCUMENTS

| 2011/0113802 A1* | 5/2011 | Wakamoto | F24F 3/06 62/196.1 |
|---|---|---|---|
| 2011/0185754 A1* | 8/2011 | Yamashita | F24F 3/06 62/132 |

(Continued)

FOREIGN PATENT DOCUMENTS

| EP | 2535652 A1 | 12/2012 |
|---|---|---|
| JP | 49-63247 | 6/1974 |

(Continued)

OTHER PUBLICATIONS

Office Action issued Jun. 30, 2015 in the corresponding Chinese patent application No. 201180075944.X.
(Continued)

*Primary Examiner* — Emmanuel Duke
(74) *Attorney, Agent, or Firm* — Posz Law Group, PLC

(57) ABSTRACT

An air-conditioning apparatus is capable of completing heat medium freeze prevention control more quickly by performing heat medium temperature rise control for raising the temperature of a cooled heat medium and includes a controller that adjusts a current opening degree of a bypass device at a bypass pipe to an opening degree, and that makes an adjustment such that the flow passage resistance in the case of the opening degree becomes equal to the flow passage resistance in the case of an opening degree before an expansion device is adjusted to a minimum opening degree.

18 Claims, 13 Drawing Sheets

(51) Int. Cl.
*F25B 25/00* (2006.01)
*F25B 49/02* (2006.01)

(52) U.S. Cl.
CPC ............ *F25B 2313/0231* (2013.01); *F25B 2313/0234* (2013.01); *F25B 2313/0272* (2013.01); *F25B 2313/02741* (2013.01); *F25B 2313/0312* (2013.01); *F25B 2313/0314* (2013.01); *F25B 2600/13* (2013.01); *F25B 2600/2513* (2013.01); *Y02B 30/745* (2013.01)

(58) Field of Classification Search
CPC ......... F25B 2600/13; F25B 2313/0272; F25B 2313/0234; F25B 2313/0314; F25B 2313/02741; F25B 2600/2513; Y02B 30/745
See application file for complete search history.

(56) References Cited

U.S. PATENT DOCUMENTS

| | | | | |
|---|---|---|---|---|
| 2011/0192184 A1* | 8/2011 | Yamashita | ............... | F24F 1/02 62/196.1 |
| 2011/0197607 A1* | 8/2011 | Tanaka | ............... | F24F 11/008 62/180 |
| 2012/0006050 A1* | 1/2012 | Takayama | ............... | F24F 3/065 62/513 |
| 2012/0031605 A1* | 2/2012 | Takayama | ............... | F24F 11/008 165/201 |
| 2012/0043054 A1* | 2/2012 | Shimazu | ............... | F25B 13/00 165/58 |
| 2012/0043056 A1* | 2/2012 | Shimazu | ............... | F24F 3/065 165/96 |
| 2012/0060551 A1* | 3/2012 | Takayama | ............... | F25B 29/00 62/513 |

FOREIGN PATENT DOCUMENTS

| | | |
|---|---|---|
| JP | 1-100044 U | 7/1989 |
| JP | 2005-016858 A | 1/2005 |
| JP | 2005-164111 A | 6/2005 |
| JP | 2009-079813 A | 4/2009 |
| JP | 2009-174769 A | 8/2009 |
| JP | 2009-243828 A | 10/2009 |
| WO | 2010/050003 A1 | 5/2010 |
| WO | 2011-099054 A1 | 8/2011 |

OTHER PUBLICATIONS

International Search Report of the International Searching Authority mailed Dec. 27, 2011 for the corresponding international application No. PCT/JP2011/006432 (and English translation).
Extended European Search Report mailed May 12, 2015 in the corresponding EP application No. 11875740.0.

\* cited by examiner

| INLET WATER TEMPERATURE Twi [°C] | FREEZING REFRIGERANT TEMPERATURE |
|---|---|
| Twi < 5 | 0 |
| 5 ≤ Twi < 10 | -2.6 |
| 10 ≤ Twi < 15 | -5.1 |
| 15 ≤ Twi < 20 | -7.7 |
| 20 < Twi | -10.2 |

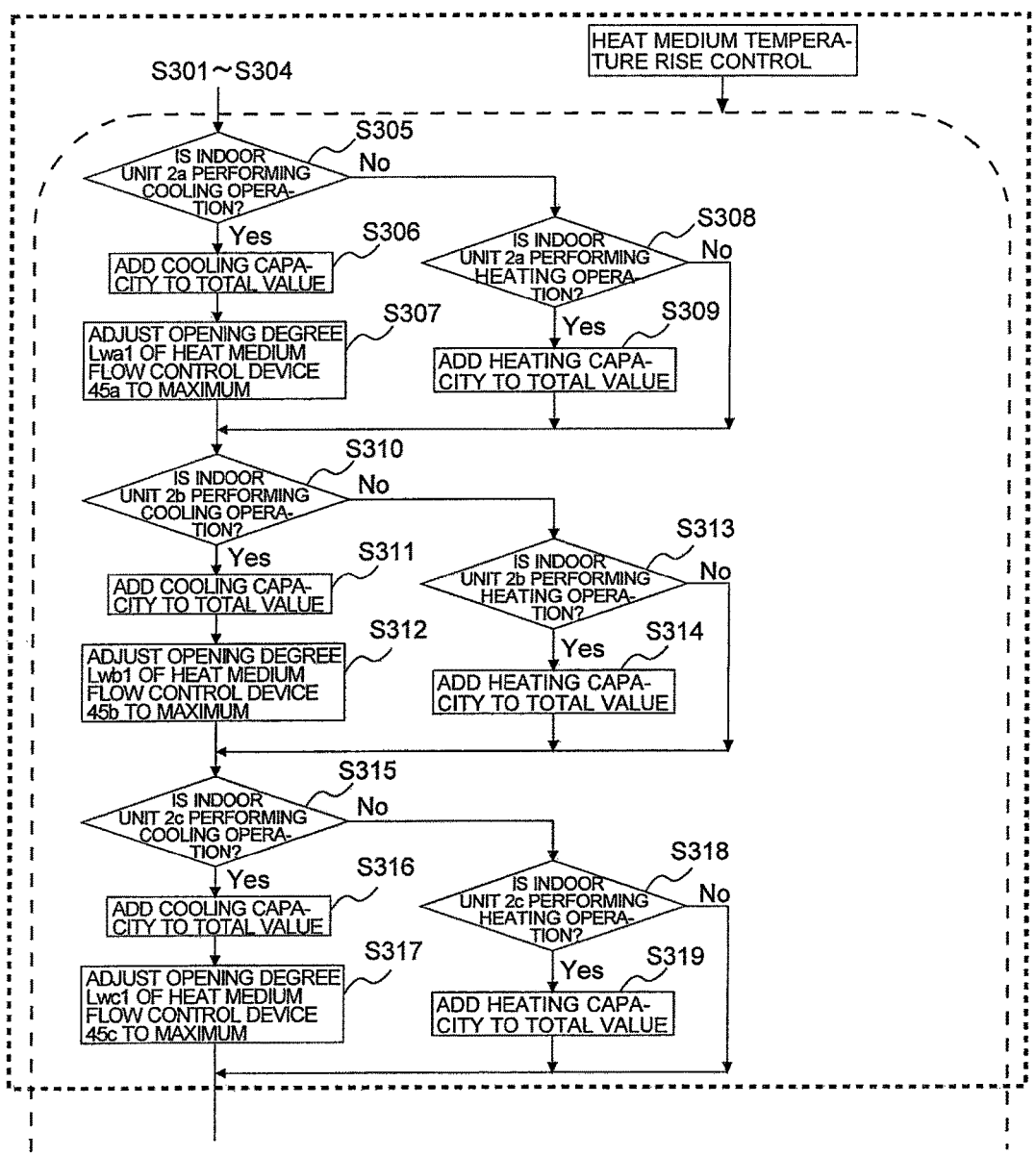

AIR-CONDITIONING APPARATUS

CROSS-REFERENCE TO RELATED APPLICATIONS

This application is a U.S. national stage application of International Application No. PCT/JP2011/006432 filed on Nov. 18, 2011, the disclosures of which are incorporated by reference.

TECHNICAL FIELD

The present invention relates to an air-conditioning apparatus used as, for example, a multi-air-conditioning apparatus or the like for buildings.

BACKGROUND ART

As a conventional air-conditioning apparatus which performs heat exchange between a refrigerant and a heat medium, such as water, a cooling apparatus (see, for example, Patent Literature 1) which detects the temperature of a low-pressure liquid refrigerant that flows into an evaporator (intermediate heat exchanger) and the inflow temperature of cooled fluid (heat medium) and determines whether the cooled fluid is frozen or not has been available. In such a cooling apparatus, when a determining unit determines "presence or absence of freezing" or "possibility of freezing," a controller controls a compressor, an air-sending device, expansion means, and a pump. In the case of occurrence of freezing, the controller issues an alarm.

Further, an air-conditioning apparatus which includes a first bypass pipe for allowing bypassing of a refrigerant inflow part and a refrigerant outflow part of a floor cooling and heating heat exchanger (intermediate heat exchanger), and flow rate control means provided at the first bypass pipe, has been available. In the case where the temperature of a low-temperature refrigerant becomes 0 [degrees Centigrade] or below, the air-conditioning apparatus allows bypassing of the floor cooling and heating heat exchanger (see, for example, Patent Literature 2).

Furthermore, an air-conditioning apparatus which includes an outdoor heat exchanger (intermediate heat exchanger) for exchanging heat between refrigerant and circulation water as heat source water which is supplied from outside, and a bypass pipe for causing refrigerant to bypass, without passing through the outdoor heat exchanger, an auxiliary heat exchanger (see, for example, Patent Literature 3), has been available. The air-conditioning apparatus, in the case where the temperature of a heat source is low, causes refrigerant to bypass the outdoor heat exchanger, thereby preventing the refrigerant from freezing.

CITATION LIST

Patent Literature

Patent Literature 1: Japanese Unexamined Patent Application Publication No. 2009-243828 (Page 8, FIG. 1)
Patent Literature 2: Japanese Unexamined Patent Application Publication No. 2005-16858 (Page 8, FIG. 3)
Patent Literature 3: Japanese Unexamined Patent Application Publication No. 2009-79813 (Page 9, FIG. 3)

SUMMARY OF INVENTION

Technical Problem

Regarding the cooling apparatus described in Patent Literature 1, a method of preventing a cooled fluid from freezing is described. In this method, in an effort of preventing the cooled fluid from freezing, the amount of cooled fluid fed by a pump is increased, and the flow velocity of the cooled fluid inside an evaporator is increased. However, there is an upper limit to an increase in the amount of cooled fluid fed by the pump, and there is a problem that freeze prevention control needs to continue for a long time so that the cooled fluid will not be freeze, when the temperature of the cooled fluid is significantly low.

In the air-conditioning apparatuses described in Patent Literature 2 and Patent Literature 3, in order to prevent a heat medium from freezing, refrigerant is caused to bypass an intermediate heat exchanger. However, in the state where the temperature of the heat medium is low, refrigerant needs to continuously bypass the intermediate heat exchanger for a long time, thus posing a problem that evaporation latent heat which should be obtained as a heat source when the intermediate heat exchanger is used as an evaporator, cannot be obtained.

The present invention has been made in order to solve the above-described problems, and it is an object of the present invention to obtain an air-conditioning apparatus capable of completing heat medium freeze prevention control more quickly, by performing heat medium temperature rise control for raising the temperature of a cooled heat medium.

Solution to Problem

An air-conditioning apparatus according to the present invention includes a refrigeration cycle configured by connecting, by a refrigerant pipe, a compressor which compresses a heat-source-side refrigerant, a first intermediate heat exchanger which performs heat exchange between the heat-source-side refrigerant and a heat medium to cool the heat medium, an expansion device which decompresses the heat-source-side refrigerant, and a heat-source-side heat exchanger which performs heat exchange between outside air and the heat-source-side refrigerant, the refrigeration cycle including a bypass pipe for allowing part of or the entire heat-source-side refrigerant that is to flow in the first intermediate heat exchanger to perform bypassing, and a bypass device which is provided at the bypass pipe and which adjusts a flow rate of the heat-source-side refrigerant that performs bypassing; a heat medium circuit configured by connecting, by a heat medium pipe, a first pump which pressure-feeds the heat medium which has been cooled by the first intermediate heat exchanger, a use-side heat exchanger which performs heat exchange between the heat medium and air in an air-conditioned space, and the first intermediate heat exchanger; refrigerant temperature detection means configured to detect a temperature of the heat-source-side refrigerant flowing into the first intermediate heat exchanger; first heat medium temperature detection means configured to detect a temperature of the heat medium circulating in the first intermediate heat exchanger; and a controller configured to adjust opening degrees of the expansion device and the bypass device. The controller, in a case where the temperature of the heat-source-side refrigerant detected by the refrigerant temperature detection means has become lower than a predetermined refrigerant temperature, performs heat medium freeze prevention control for adjusting the opening degrees of the bypass device and the expansion device and causing the part of or the entire heat-source-side refrigerant that is to flow in the first intermediate heat exchanger to perform bypassing to flow through the bypass pipe, and during execution of the heat medium freeze prevention control, performs heat medium temperature rise control in which by driving the first pump to pressure-feed the heat medium and causing the use-side heat exchanger to perform heat exchange between the heat medium and the air in the air-conditioned space, the temperature of the cooled heat medium is raised so that the temperature of the heat medium detected by the first heat medium temperature detection means becomes a predetermined heat medium temperature serving as a target temperature.

Advantageous Effects of Invention

According to the present invention, even in the case where due to a low outside air temperature or the like, the evaporating temperature at a first intermediate heat exchanger is lowered and there is a risk that the heat medium may freeze at the first intermediate heat exchanger, by performing heat medium freeze prevention control, freeze of the heat medium at the first intermediate heat exchanger may be prevented and the occurrence of damage to the first intermediate heat exchanger may thus be suppressed, and by performing heat medium temperature rise control, the temperature of the heat medium may be raised and the heat medium freeze prevention control may thus be completed quickly.

DESCRIPTION OF EMBODIMENTS

Embodiment 1.
(Configuration of Air-Conditioning Apparatus)
FIG. 1 is a system circuit diagram of an air-conditioning apparatus according to Embodiment 1 of the present invention.

The air-conditioning apparatus according to Embodiment 1 utilizes a refrigerant circuit (a refrigeration cycle and a heat medium circuit, which will be described later) through which refrigerants (a heat-source-side refrigerant and a heat medium) circulate, so that individual indoor units are allowed to freely choose between a cooling operation and a heating operation. Further, the air-conditioning apparatus according to Embodiment 1 employs a method which indirectly utilizes a heat-source-side refrigerant. That is, the air-conditioning apparatus according to Embodiment 1 transmits cooling energy or heating energy stored in the heat-source-side refrigerant to a heat medium which is a refrigerant different from the heat-source-side refrigerant, and with the cooling energy or heating energy stored in the heat medium, an air-conditioning target space is cooled or heated.

Figure 1:
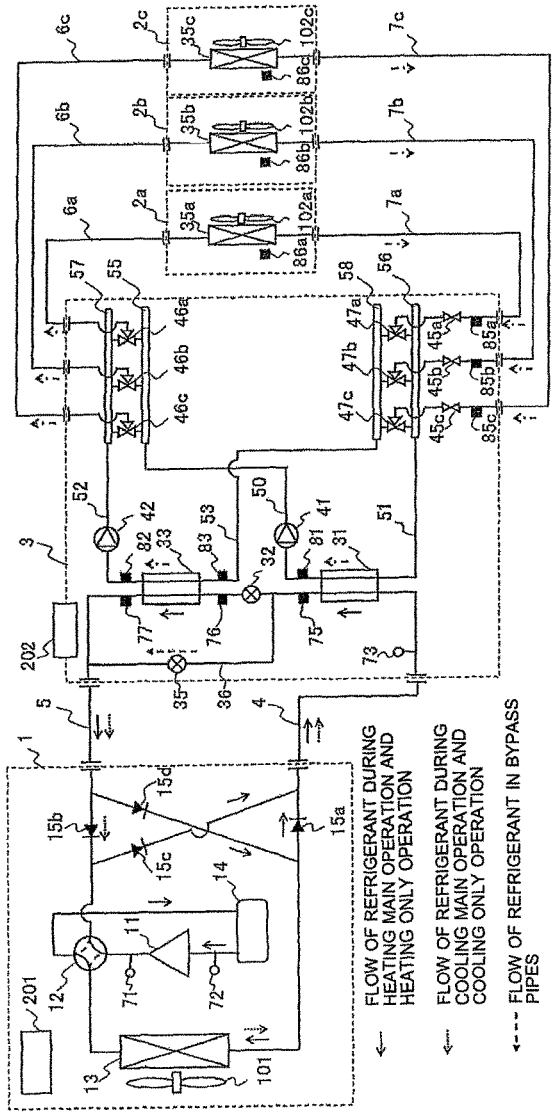
FIG. 1 is a system circuit diagram of an air-conditioning apparatus according to Embodiment 1 of the present invention.

As illustrated in FIG. 1, the air-conditioning apparatus according to Embodiment 1 includes one outdoor unit 1 serving as a heat source unit, a plurality of indoor units 2a to 2c, and a relay unit 3 interposed between the outdoor unit 1 and the indoor units 2a to 2c. The outdoor unit 1 and the relay unit 3 are connected by a high-pressure pipe 4 and a low-pressure pipe 5 through which heat-source-side refrigerant circulates. The relay unit 3 and the indoor units 2a to 2c (when they are collectively referred to without being discriminated from each other, they are simply called "indoor units 2") are connected by heat medium pipes 6a and 7a, heat medium pipes 6b and 7b, and heat medium pipes 6c and 7c, through each of which refrigerant circulates. Cooling energy or heating energy generated by the outdoor unit 1 is transmitted to the indoor units 2 via the relay unit 3.

As illustrated in FIG. 1, in the air-conditioning apparatus according to Embodiment 1, the refrigeration cycle is configured by connecting, by refrigerant pipes, a compressor 11, a four-way valve 12, a heat-source-side heat exchanger 13, an accumulator 14, check valves 15a to 15d, a second intermediate heat exchanger 31, a first intermediate heat exchanger 33, an expansion device 32 such as an electronic expansion valve, and a bypass device 35. A heat-source-side refrigerant circulates through the refrigeration cycle. As a heat-source-side refrigerant, for example, a single refrigerant such as R-22 or R-134a, a near-azeotropic refrigerant mixture such as R-410A or R-404A, a non-azeotropic refrigerant mixture such as R-407C, refrigerant having a relatively small global warming potential, such as $CF_3CF=CH_2$, which has a double bond in its chemical formula or a mixture of such refrigerants, or a natural refrigerant such as $CO_2$ or propane, is used.

Further, the heat medium circuit is configured by connecting, by heat medium pipes, the second intermediate heat exchanger 31, the first intermediate heat exchanger 33, use-side heat exchangers 35a to 35c, a second pump 41 and a first pump 42 serving as heat medium feeding devices, heat medium flow control devices 45a to 45c, heat medium flow switching devices 46a to 46c, and heat medium flow switching devices 47a to 47c. A heat medium circulates through the heat medium circuit. As a heat medium, safe liquid, such as water or antifreeze, is used.

The number of each of the indoor units 2a to 2c, the heat medium flow control devices 45a to 45c, the heat medium flow switching devices 46a to 46c, and the heat medium flow switching devices 47a to 47c may be set in a desired manner.

(Configuration of Outdoor Unit 1)

The outdoor unit 1 is usually installed in an outdoor space outside a building or the like (for example, a rooftop or the like) and supplies cooling energy or heating energy to the indoor units 2 via the relay unit 3. Further, the outdoor unit 1 includes the compressor 11, the four-way valve 12, the heat-source-side heat exchanger 13, the accumulator 14, and the check valves 15a to 15d. The outdoor unit 1 also includes a controller 201 which controls the entire air-conditioning apparatus according to Embodiment 1. Furthermore, the outdoor unit 1 includes a refrigerant pressure sensor 71 for detecting the pressure of a discharge refrigerant of the compressor 11 and a refrigerant pressure sensor 72 for detecting the suction pressure of the compressor 11. The refrigerant pressure sensors 71 and 72 send the detected pressure information of the heat-source-side refrigerant to the controller 201.

The compressor 11 sucks the heat-source-side refrigerant in a gas state, compresses the heat-source-side refrigerant, and turns the heat-source-side refrigerant into a high-temperature and high-pressure state. For example, the compressor 11 may be configured as an inverter compressor or the like for which capacity may be controlled.

The four-way valve 12 is positioned on the discharge side of the compressor 11, and based on a control signal from the controller 201, the four-way valve 12 switches the flow of the heat-source-side refrigerant between a heating operation (a heating only operation and a heating main operation, which will be described later) and a cooling operation (a cooling only operation and a cooling main operation, which will be described later). Here, a heating only operation means an operation where all the operating indoor units 2 are performing heating, and a heating main operation means an operation where a plurality of the indoor units 2 are performing either a heating operation or a cooling operation (including a dehumidifying operation) and heating load is greater than others. In addition, a cooling only operation means an operation where all the operating indoor units 2 are performing cooling, and a cooling main operation means an operation where a plurality of the indoor units 2 are performing either a heating operation or a cooling operation (including a dehumidifying operation) and the cooling load is greater than others.

The heat-source-side heat exchanger 13 is provided between the four-way valve 12 and the check valve 15a, which will be described later, and exchanges heat between air sent from a fan 101 and the heat-source-side refrigerant. Further, the heat-source-side heat exchanger 13 functions as an evaporator at the time of a heating operation, and evaporates and gasifies the heat-source-side refrigerant. In contrast, the heat-source-side heat exchanger 13 functions as a condenser (or a radiator) at the time of a cooling operation, and compresses and liquefies the heat-source-side refrigerant. In some cases, the heat-source-side refrigerant may not be completely gasified or liquefied, but may be turned into the heat-source-side refrigerant in a two-phase gas-liquid state.

The accumulator 14 is provided on the suction side of the compressor 11, and has a function of storing an excess heat-source-side refrigerant in the refrigeration cycle to prevent a large amount of heat-source-side refrigerant in a liquid state from returning to the compressor 11 and damaging the compressor 11.

The check valves 15a to 15d are configured to allow the heat-source-side refrigerant to flow in one direction only. Specifically, the check valves 15a is provided to a refrigerant pipe which connects the heat-source-side heat exchanger 13 and the high-pressure pipe 4, and causes the refrigerant to flow only in the direction from the heat-source-side heat exchanger 13 toward the high-pressure pipe 4.

The check valve 15b is provided to a refrigerant pipe which connects the low-pressure pipe 5 and the four-way valve 12, and causes the refrigerant to flow only in the direction from the low-pressure pipe 5 toward the four-way valve 12.

The check valve 15c is provided to a refrigerant pipe which connects a refrigerant pipe connecting the four-way valve 12 and the check valve 15b and a refrigerant pipe connecting the high-pressure pipe 4 and the check valve 15a, and causes the refrigerant to flow only in the direction from the four-way valve 12 toward the high-pressure pipe 4.

The check valve 15d is provided to a refrigerant pipe which connects a refrigerant pipe connecting the low-pressure pipe 5 and the check valve 15b and a refrigerant pipe connecting the heat-source-side heat exchanger 13 and the high-pressure pipe 4, and causes the refrigerant to flow only in the direction from the low-pressure pipe 5 toward the heat-source-side heat exchanger 13.

In FIG. 1, a single outdoor unit is illustrated as the outdoor unit 1. However, the number of the outdoor units 1 is not limited to this, and two or more outdoor units 1 may be installed.

(Configuration of Indoor Unit 2)

The indoor units 2 (indoor units 2a to 2c) are provided in positions from which air for cooling or air for heating may be supplied to an indoor space inside a building (for example, a living room or the like), which is an air-conditioning target space, and supplies air for cooling or air for heating to the air-conditioning target space. The indoor units 2a to 2c include the use-side heat exchangers 35a to 35c, respectively.

The use-side heat exchangers 35a to 35c are provided between the heat medium pipes 6a to 6c and the heat medium pipes 7a to 7c, respectively, and perform heat exchange between indoor air sent from fans 102a to 102c and a heat medium. Further, the use-side heat exchangers 35a to 35c, at the time of a heating operation, heat indoor air through the heat medium and generate air for heating, while at the time of a cooling operation, cool indoor air through the heat medium and generate air for cooling. Furthermore, the use-side heat exchangers 35a to 35c include suction air temperature sensors 86a to 86c, respectively, which detect the temperature of indoor air (suction air temperature) sucked into the indoors units 2a to 2c, respectively. The suction air temperature sensors 86a to 86c send the detected indoor air temperature information to a controller 202 of the relay unit 3, which will be described later.

In FIG. 1, the three indoor units 2a to 2c are illustrated as the indoor units 2. However, the number of the indoor units 2 is not limited to this, and one, two, four, or more indoor units 2 may be installed.

The suction air temperature sensors 86a to 86c correspond to "suction air temperature detection means" of the present invention.

(Configuration of Relay Unit 3)

The relay unit 3 is configured as a component separated from the outdoor unit 1 and the indoor units 2 in such a manner that the relay unit 3 may be installed at a position different from an outdoor space or an indoor space, and transmits cooling energy or heating energy supplied from the outdoor unit 1 to the indoor units 2. Further, the relay unit 3 includes the second intermediate heat exchanger 31, the first intermediate heat exchanger 33, the expansion device 32, the bypass device 35, the second pump 41, the first pump 42, the heat medium flow control devices 45a to 45c, and the heat medium flow switching devices 46a to 46c and 47a to 47c. Furthermore, the relay unit 3 includes the controller 202 which controls the entire relay unit 3. In addition, the relay unit 3 includes a refrigerant pressure sensor 73, refrigerant temperature sensors 75 to 77, and heat medium temperature sensors 81 to 83 and 85a to 85c.

The second intermediate heat exchanger 31 and the first intermediate heat exchanger 33 each include a refrigerant flow passage through which the heat-source-side refrigerant passes and a heat medium flow passage through which the heat medium passes, and perform heat exchange between the heat-source-side refrigerant and the heat medium. The second intermediate heat exchanger 31, out of the second intermediate heat exchanger 31 and the first intermediate heat exchanger 33, is provided between the expansion device 32 and the high-pressure pipe 4 in the refrigeration cycle and between the second pump 41 and a heat medium merging part 56, which will be described later, in the heat medium circuit. The second intermediate heat exchanger 31 functions as a condenser (or a radiator) for the heat-source-side refrigerant in a cooling main operation, a heating only operation, and a heating main operation, and transfers heat from the heat-source-side refrigerant to heat the heat medium. Here, a heat medium pipe connecting the second intermediate heat exchanger 31 and the heat medium merging part 56 is defined as a heat medium flow passage 51. In contrast, the first intermediate heat exchanger 33 is provided between the low-pressure pipe 5 and the expansion device 32 in the refrigeration cycle, and between the first pump 42 and a heat medium merging part 58, which will be described later, in the heat medium circuit. The first intermediate heat exchanger 33 functions as an evaporator for the heat-source-side refrigerant in a cooling only operation, a cooling main operation, and a heating main operation, and causes the heat-source-side refrigerant to receive heat to cool the heat medium. Here, a heat medium pipe connecting the first intermediate heat exchanger 33 and the heat medium merging part 58 is defined as a heat medium flow passage 53.

The expansion device 32 is provided between the second intermediate heat exchanger 31 and the first intermediate heat exchanger 33 in the refrigeration cycle, and expands and decompresses the heat-source-side refrigerant.

The bypass device 35 is provided to a bypass pipe 36 which connects a refrigerant pipe connecting the low-pressure pipe 5 and the first intermediate heat exchanger 33, and a refrigerant pipe connecting the expansion device 32 and the second intermediate heat exchanger 31. The bypass device 35 functions as a pressure-reducing/expansion device, and by opening the opening degree of the bypass device 35, part of the heat-source-side refrigerant that has flowed out of the second intermediate heat exchanger 31 is caused to perform bypassing and flow to the outflow side of the first intermediate heat exchanger 33.

The second pump 41 and the first pump 42 are configured to pressure-feed the heat medium and circulate the heat medium in the heat medium circuit. In the second pump 41 and the first pump 42, the rotation speed of motors (not illustrated in the drawing) provided therein is controlled in accordance with a control signal from the controller 202, by which the flow rate of the heat medium to be pressure-fed can be varied. The second pump 41, out of the second pump 41 and the first pump 42, is provided between the second intermediate heat exchanger 31 and a heat medium branching part 55, which will be described later, and the first pump 42 is provided between the first intermediate heat exchanger 33 and a heat medium branching part 57, which will be described later. A heat medium pipe connecting the second pump 41 and the heat medium branching part 55 is defined as a heat medium flow passage 50, and a heat medium pipe connecting the first pump 42 and the heat medium branching part 57 is defined as a heat medium flow passage 52.

The second pump 41 may be provided between the second intermediate heat exchanger 31 and the heat medium branching part 56, which will described later. Further, the first pump 42 may be provided between the first intermediate heat exchanger 33 and the heat medium merging part 58, which will be described later.

The heat medium flow control devices 45a to 45c are two-way flow rate control valves, which are installed between the use-side heat exchangers 35a to 35c and the heat medium flow switching devices 47a to 47c, respectively. The heat medium flow control devices 45a to 45c control the flow rates of heat medium flowing into the use-side heat exchangers 35a to 35c, respectively.

The heat medium flow switching devices 46a to 46c are three-way valves, each of which is connected to the heat medium branching part 55 and the heat medium branching part 57 and which are connected to the heat medium pipes 6a to 6c, respectively. The heat medium flow switching device 46a, out of the heat medium flow switching devices 46a to 46c, feeds to the heat medium pipe 6a either a heated heat medium to be caused to flow into the heat medium branching part 55 or a cooled heat medium to be caused to flow into the heat medium branching part 57 in a switchable manner. Similar operations are performed for the heat medium pipes 6b and 6c by the heat medium flow switching devices 46b and 46c, respectively.

The heat medium flow switching devices 47a to 47c are three-way valves, each of which is connected to the heat medium merging part 56 and the heat medium merging part 58 and which are connected to the heat medium pipes 7a to 7c, respectively. The heat medium flow switching device 47a, out of the heat medium flow switching devices 47a to 47c, feeds the heat medium flowing from the heat medium pipe 7a either to the heat medium merging part 56 or to the heat medium merging part 58 in a switchable manner. Similar operations are performed on the heat medium pipes 7b and 7c by the heat medium flow switching devices 47b and 47c, respectively.

The refrigerant pressure sensor 73 is provided to a refrigerant pipe between the high-pressure pipe 4 and the second intermediate heat exchanger 31, detects the pressure (condensing pressure) of the heat-source-side refrigerant flowing into the second intermediate heat exchanger 31, and sends the detected pressure information of the heat-source-side refrigerant to the controller 202.

The refrigerant pressure sensor 73 may be provided on the outflow side of the heat-source-side refrigerant of the second intermediate heat exchanger 31.

The refrigerant temperature sensor 75 is provided to a refrigerant pipe on the outflow side of the heat-source-side refrigerant of the second intermediate heat exchanger 31 (between the second intermediate heat exchanger 31 and the expansion device 32), and detects the temperature of the heat-source-side refrigerant flowing out of the second intermediate heat exchanger 31. The refrigerant temperature sensor 76 is provided to a refrigerant pipe on the inflow side of the heat-source-side refrigerant of the first intermediate heat exchanger 33 (between the expansion device 32 and the first intermediate heat exchanger 33), and detects the temperature of the heat-source-side refrigerant flowing into the first intermediate heat exchanger 33. The refrigerant temperature sensor 77 is provided to a refrigerant pipe on the outflow side of the heat-source-side refrigerant of the first intermediate heat exchanger 33 (between the first intermediate heat exchanger 33 and the low-pressure pipe 5), and detects the temperature of the heat-source-side refrigerant flowing out of the first intermediate heat exchanger 33. The refrigerant temperature sensors 75 to 77 send the detected temperature information of heat-source-side refrigerants to the controller 202.

The heat medium temperature sensor 81 is provided to a heat medium pipe on the outflow side of the heat medium of the second intermediate heat exchanger 31 (between the second intermediate heat exchanger 31 and the second pump 41), and detects the temperature of the heat medium flowing out of the second intermediate heat exchanger 31. The heat medium temperature sensor 82 is provided to a heat medium pipe on the outflow side of the heat medium of the first intermediate heat exchanger 33 (between the first intermediate heat exchanger 33 and the first pump 42), and detects the temperature of the heat medium flowing out of the first intermediate heat exchanger 33. The heat medium temperature sensor 83 is provided to a heat medium pipe on the inflow side of the heat medium of the first intermediate heat exchanger 33 (between the heat medium merging part 58 and the first intermediate heat exchanger 33), and detects the temperature of the heat medium flowing into the first intermediate heat exchanger 33. The heat medium temperature sensors 81 to 83 send the detected temperature information of heat medium to the controller 202.

The heat medium temperature sensors 85a to 85c are provided to heat medium pipes on the outflow side of heat medium of the heat medium flow control devices 45a to 45c, respectively, detect the temperature of the heat medium flowing out of the use-side heat exchangers 35a to 35c, and send the detected temperature information of heat medium to the controller 202.

In FIG. 1, a single relay unit is illustrated as the relay unit 3. However, the number of the relay units 3 is not limited to this, and two or more relay units 3 may be installed.

The refrigerant temperature sensor 76, the heat medium temperature sensor 83, and the heat medium temperature sensors 85a to 85c correspond to "refrigerant temperature detection means," "first heat medium temperature detection means," and "second heat medium temperature detection means", respectively, of the present invention.

Operations in individual operation modes of the air-conditioning apparatus according to Embodiment 1 will now be described with reference to FIG. 1. As for expressions of being high and being low in the pressure of the heat-source-side refrigerant in the refrigeration cycle, they do not indicate higher or lower values in relation to a specific pressure value, but they show relative values within the refrigeration cycle. This is also applied to expressions of high and low in temperature.

(Cooling Main Operation)

First, in the case where the indoor units 2a to 2c perform cooling and heating operations in a mixed manner, based on the assumption, for example, that the indoor units 2a and 2b are performing a cooling operation and the indoor unit 2c is performing a heating operation, a cooling main operation in which the capacity of a cooling operation is large, will be described. In the cooling main operation, the controller 201 causes the four-way valve 12 to switch a refrigerant flow passage such that the heat-source-side refrigerant discharged from the compressor 11 flows into the heat-source-side heat exchanger 13. The controller 202 also drives the second pump 41 and the first pump 42 to cause the heat medium flow control devices 45a to 45c to be opened. Further, the controller 202 causes the heat medium flow switching devices 46a and 46b to switch heat medium flow passages such that heat medium flows into the heat medium pipes 6a and 6b, respectively, from the heat medium branching part 57, and the controller 202 causes the heat medium flow switching device 46c to switch a heat medium flow passage such that the heat medium flows into the heat medium pipe 6c from the heat medium branching part 55. Furthermore, the controller 202 causes the heat medium flow switching devices 47a and 47b to switch heat medium flow passages such that heat medium flows into the heat medium merging part 58 from the heat medium pipes 7a and 7b, respectively, and the controller 202 causes the heat medium flow switching device 47c to switch a heat medium flow passage such that the heat medium flows into the heat medium merging part 56 from the heat medium pipe 7c.

First, the flow of the heat-source-side refrigerant in the refrigeration cycle will be described.

A low-temperature and low-pressure gas refrigerant is compressed by the compressor 11, is discharged as a high-temperature and high-pressure heat-source-side refrigerant, flows into the heat-source-side heat exchanger 13 via the four-way valve 12, condenses while transferring heat to air sent by the fan 101, and turns into a high-pressure, two-phase gas-liquid refrigerant. The two-phase gas-liquid refrigerant which has flowed out of the heat-source-side heat exchanger 13 flows out of the outdoor unit 1 via the check valve 15a, passes through the high-pressure pipe 4, and flows into the relay unit 3.

The two-phase gas-liquid refrigerant which has flowed into the relay unit 3 flows into the second intermediate heat exchanger 31, condenses while heating the heat medium by transferring heat to the heat medium circulating in the heat medium circuit, and turns into a high-pressure liquid refrigerant. The liquid refrigerant which has flowed out of the second intermediate heat exchanger 31 is expanded and decompressed by the expansion device 32, and turns into a low-temperature and low-pressure, two-phase gas-liquid refrigerant. The two-phase gas-liquid refrigerant flows into the first intermediate heat exchanger 33, evaporates while cooling the heat medium by receiving heat from the heat medium circulating in the heat medium circuit, and turns into a low-temperature and low-pressure gas refrigerant. The gas refrigerant which has flowed out of the first intermediate heat exchanger 33 flows out of the relay unit 3, passes through the low-pressure pipe 5, and flows into the outdoor unit 1.

The gas refrigerant which has flowed into the outdoor unit 1 is again sucked into the compressor 11, via the check valve 15b, the four-way valve 12, and the accumulator 14.

Next, the flow of the heat medium in the heat medium circuit will be described.

At the first intermediate heat exchanger 33, cooling energy of the heat-source-side refrigerant is transmitted to the heat medium, and the cooled heat medium circulates in the heat medium circuit by the first pump 42. The heat medium pressure-fed by the first pump 42 passes through the heat medium flow passage 52, and flows into the heat medium branching part 57. The heat medium which has been split at the heat medium branching part 57 flows through a heat medium flow passage in which the heat medium flows out of the relay unit 3 via the heat medium flow switching device 46a and flows in the heat medium pipe 6a and a heat medium flow passage in which the heat medium flows out of the relay unit 3 via the heat medium flow switching device 46b and flows in the heat medium pipe 6b. The heat medium flowing through the heat medium pipes 6a and 6b flows into the indoor units 2a and 2b, respectively.

The heat medium which has flowed into the indoor units 2a and 2b flows into the use-side heat exchangers 35a and 35b, respectively, and receive heat from indoor air sent by the fans 102a and 102b. Thus, a cooling operation is performed for the corresponding indoor spaces. The heat medium flows out of the use-side heat exchangers 35a and 35b, the heat medium whose temperature has been raised flow out of the indoor units 2a and 2b, respectively, passes through the heat medium pipes 7a and 7b, and flows into the relay unit 3.

The heat medium which has flowed into the relay unit 3 after passing through the heat medium pipes 7a and 7b, flows into the first intermediate heat exchanger 33 via the heat medium flow control devices 45a and 45b, the heat medium flow switching devices 47a and 47b, the heat medium merging part 58, and the heat medium flow passage 53. At this time, the flow rates of the heat medium are controlled by the opening degrees of the heat medium flow control devices 45a and 45b so that the heat medium flows into the use-side heat exchangers 35a and 35b with flow rates which meet required air-conditioning loads in the corresponding indoor spaces.

In contrast, at the second intermediate heat exchanger 31, heating energy of the heat-source-side refrigerant is transmitted to the heat medium, and the heated heat medium circulates in the heat medium circuit by the second pump 41. The heat medium pressure-fed by the second pump 41 passes through the heat medium flow passage 50, flows into the heat medium branching part 55, flows out of the relay unit 3 via the heat medium flow switching device 46c, passes through the heat medium pipe 6c, and flows into the indoor unit 2c.

The heat medium which has flowed into the indoor unit 2c flows into the use-side heat exchanger 35c, and transfers heat to indoor air sent by the fan 102c. Thus, a heating operation is performed for the corresponding indoor space. The heat medium which has flowed out of the use-side heat exchanger 35c and whose temperature has been lowered, flows out of the indoor unit 2c, passes through the heat medium pipe 7c, and flows into the relay unit 3.

The heat medium which has flowed into the relay unit 3 flows into the second intermediate heat exchanger 31 via the heat medium flow control device 45c, the heat medium flow switching device 47c, the heat medium merging part 56, and the heat medium flow passage 51. At this time, the flow rate of the heat medium is controlled by the opening degree of the heat medium flow control device 45c so that the heat medium flows into the use-side heat exchanger 35c with a flow rate which meets a required air-conditioning load in the corresponding indoor space.

As described above, due to switching of heat medium flow passages by the heat medium flow switching devices 46a to 46c and 47a to 47c, a heated heat medium and a cooled heat medium are not mixed together, and are caused to flow into the use-side heat exchangers 35a and 35b having cooling load and the use-side heat exchanger 35c having heating load.

(Heating Main Operation)

Next, in the case where the indoor units 2a to 2c perform cooling and heating operations in a mixed manner, based on the assumption, for example, that the indoor units 2a and 2b are performing a heating operation and the indoor unit 2c is performing a cooling operation, a heating main operation in which the capacity of a heating operation is large, will be described. In the heating main operation, the controller 201 causes the four-way valve 12 to switch a refrigerant flow passage such that the heat-source-side refrigerant discharged from the compressor 11 flows toward the check valve 15c. The controller 202 also drives the second pump 41 and the first pump 42 to cause the heat medium flow control devices 45a to 45c to be opened. Further, the controller 202 causes the heat medium flow switching devices 46a and 46b to switch heat medium flow passages such that heat medium flows into the heat medium pipes 6a and 6b, respectively, from the heat medium branching part 55, and the controller 202 causes the heat medium flow switching device 46c to switch a heat medium flow passage such that the heat medium flows into the heat medium pipe 6c from the heat medium branching part 57. Further, the controller 202 causes the heat medium flow switching devices 47a and 47b to switch heat medium flow passages such that heat medium flows into the heat medium merging part 56 from the heat medium pipes 7a and 7b, respectively, and the controller 202 causes the heat medium flow switching device 47c to switch a heat medium flow passage such that the heat medium flows into the heat medium merging part 58 from the heat medium pipe 7c.

First, the flow of the heat-source-side refrigerant in the refrigeration cycle will be described.

A low-temperature and low-pressure gas refrigerant is compressed by the compressor 11, is discharged as a high-temperature and high-pressure heat-source-side refrigerant, passes through the high-pressure pipe 4 via the four-way valve 12 and the check valve 15c, and flows into the relay unit 3.

The heat-source-side refrigerant which has flowed into the relay unit 3 flows into the second intermediate heat exchanger 31, condenses while heating the heat medium by transferring heat to the heat medium circulating in the heat medium circuit, and turns into a high-pressure liquid refrigerant. The liquid refrigerant which has flowed out of the second intermediate heat exchanger 31 is expanded and decompressed by the expansion device 32, and turns into a low-temperature and low-pressure, two-phase gas-liquid refrigerant. The two-phase gas-liquid refrigerant flows into the first intermediate heat exchanger 33, while cooling the heat medium by receiving heat from the heat medium circulating in the heat medium circuit, turns into a partially-evaporated two-phase gas-liquid refrigerant. The two-phase gas-liquid refrigerant which has flowed out of the first intermediate heat exchanger 33 flows out of the relay unit 3, passes through the low-pressure pipe 5, and flows into the outdoor unit 1.

The two-phase gas-liquid refrigerant which has flowed into the outdoor unit 1 flows into the heat-source-side heat exchanger 13 via the check valve 15d, evaporates while receiving heat from air sent by the fan 101, and turns into a low-temperature and low-pressure gas refrigerant. The gas refrigerant which has flowed out of the heat-source-side heat exchanger 13 is sucked again into the compressor 11 via the four-way valve 12 and the accumulator 14.

Next, the flow of the heat medium in the heat medium circulation circuit will be described.

At the second intermediate heat exchanger 31, heating energy of the heat-source-side refrigerant is transmitted to the heat medium, and the heated heat medium circulates in the heat medium circuit by the second pump 41. The heat medium pressure-fed by the second pump 41 passes through the heat medium flow passage 50, and flows into the heat medium branching part 55. The heat medium which has been split at the heat medium branching part 55 flows through a heat medium flow passage in which the heat medium flows out of the relay unit 3 via the heat medium flow switching device 46a and flows in the heat medium pipe 6a and a heat medium flow passage in which the heat medium flows out of the relay unit 3 via the heat medium flow switching device 46b and flows in the heat medium pipe 6b. The heat medium flowing through the heat medium pipes 6a and 6b flows into the indoor units 2a and 2b, respectively.

The heat medium which has flowed into the indoor units 2a and 2b flows into the use-side heat exchangers 35a and 35b, respectively, and transfers heat to indoor air sent by the fans 102a and 102b. Thus, a heating operation is performed for the corresponding indoor spaces. The heat medium which has flowed out of the use-side heat exchangers 35a and 35b and whose temperature has been lowered, flows out of the indoor units 2a and 2b, respectively, passes through the heat medium pipes 7a and 7b, and flows into the relay unit 3.

The heat medium which has flowed into the relay unit 3 after passing through the heat medium pipes 7a and 7b, flows into the second intermediate heat exchanger 31 via the heat medium flow control devices 45a and 45b, the heat medium flow switching devices 47a and 47b, the heat medium merging part 56, and the heat medium flow passage 51. At this time, the flow rates of the heat medium are controlled by the opening degrees of the heat medium flow control devices 45a and 45b so that the heat medium flows into the use-side heat exchangers 35a and 35b with flow rates which meet required air-conditioning loads in the corresponding indoor spaces.

In contrast, at the first intermediate heat exchanger 33, cooling energy of the heat-source-side refrigerant is transmitted to the heat medium, and the cooled heat medium circulates in the heat medium circuit by the first pump 42. The heat medium pressure-fed by the first pump 42 passes through the heat medium flow passage 52, flows into the heat medium branching part 57, flows out of the relay unit 3 via the heat medium flow switching device 46c, passes through the heat medium pipe 6c, and flows into the indoor unit 2c.

The heat medium which has flowed into the indoor unit 2c flows into the use-side heat exchanger 35c, and receives heat from indoor air sent by the fan 102c. Thus, a heating operation is performed for the corresponding indoor space. The heat medium which has flowed out of the use-side heat exchanger 35c and whose temperature has been raised, flows out of the indoor unit 2c, passes through the heat medium pipe 7c, and flows into the relay unit 3.

The heat medium which has flowed into the relay unit 3 flows into the first intermediate heat exchanger 33 via the heat medium flow control device 45c, the heat medium flow switching device 47c, the heat medium merging part 58, and the heat medium flow passage 53. At this time, the flow rate of the heat medium is controlled by the opening degree of the heat medium flow control device 45c so that the heat medium flows into the use-side heat exchanger 35c with a flow rate which meets a required air-conditioning load in the corresponding indoor space.

As described above, due to switching of heat medium flow passages by the heat medium flow switching devices 46a to 46c and 47a to 47c, a heated heat medium and a cooled heat medium are not mixed together, and are caused to flow into the use-side heat exchangers 35a and 35b having cooling load and the use-side heat exchanger 35c having heating load.

(Cooling Only Operation)

Next, a cooling only operation in which all the indoor units 2a to 2c perform a cooling operation will be described. In the cooling only operation, the controller 201 causes the four-way valve 12 to switch a refrigerant flow passage such that a heat-source-side refrigerant discharged from the compressor 11 flows into the heat-source-side heat exchanger 13. The controller 202 drives only the first pump 42, suspends the second pump 41, and causes the heat medium flow control devices 45a to 45c to be opened. Further, the controller 202 causes the heat medium flow switching devices 46a to 46c to switch heat medium flow passages such that heat medium flows into the heat medium pipes 6a to 6c, respectively, from the heat medium branching part 57. Furthermore, the controller 202 causes the heat medium flow switching devices 47a to 47c to switch heat medium flow passages such that heat medium flows into the heat medium merging part 58 from the heat medium pipes 7a to 7c, respectively.

The description of the cooling only operation provided below is mainly focused on differences from a cooling main operation.

First, the flow of the heat-source-side refrigerant in the refrigeration cycle will be described. While the flow of the heat-source-side refrigerant is similar to that in the case of a cooling main operation, there are differences in performance of individual devices, as described below.

The high-temperature and high-pressure heat-source-side refrigerant which has flowed into the heat-source-side heat exchanger 13 condenses while transferring heat to air sent by the fan 101, and turns into a high-pressure liquid refrigerant. The second pump 41 is suspended and the heat-source-side refrigerant does not condense at the second intermediate heat exchanger 31.

In the cooling only operation, due to the configuration of the refrigeration cycle, the second intermediate heat exchanger 31 and the first intermediate heat exchanger 33 are connected in series, in which evaporation of the heat-source-side refrigerant occurs only at the first intermediate heat exchanger 33. However, configuration is not limited to this. That is, the second intermediate heat exchanger 31 and the first intermediate heat exchanger 33 may be configured to be connected in parallel, and evaporation of the heat-source-side refrigerant may occur at both the intermediate heat exchangers.

Next, the flow of the heat medium in the heat medium circuit will be described.

At the first intermediate heat exchanger 33, cooling energy of the heat-source-side refrigerant is transmitted to the heat medium, and the cooled heat medium circulates in the heat medium circuit by the first pump 42. The heat medium pressure-fed by the first pump 42 passes through the heat medium flow passage 52, and flows into the heat medium branching part 57. The heat medium which has been split at the heat medium branching part 57 flows through a heat medium flow passage in which the heat medium flows out of the relay unit 3 via the heat medium flow switching device 46a and flows in the heat medium pipe 6a, a heat medium flow passage in which the heat medium flows out of the relay unit 3 via the heat medium flow switching device 46b and flows in the heat medium pipe 6b, and a heat medium flow passage in which the heat medium flows out of the relay unit 3 via the heat medium flow switching device 46c and flows in the heat medium pipe 6c. The heat medium flowing through the heat medium pipes 6a to 6c flows into the indoor units 2a to 2c, respectively.

The heat medium which has flowed into the indoor units 2a to 2c flows into the use-side heat exchangers 35a to 35c, respectively, and receives heat from indoor air sent by the fans 102a to 102c. Thus, a cooling operation is performed for the corresponding indoor spaces. The heat medium which has flowed out of the use-side heat exchangers 35a to 35c and whose temperature has been raised, flows out of the indoor units 2a to 2c, respectively, passes through the heat medium pipes 7a to 7c, and flows into the relay unit 3.

The heat medium which has flowed into the relay unit 3 after passing through the heat medium pipes 7a to 7c, flows into the first intermediate heat exchanger 33 via the heat medium flow control devices 45a to 45c, the heat medium flow switching devices 47a to 47c, the heat medium merging part 58, and the heat medium flow passage 53. At this time, the flow rates of the heat medium are controlled by the opening degrees of the heat medium flow control devices 45a to 45c so that the heat medium flows into the use-side heat exchangers 35a to 35c with flow rates which meet required air-conditioning loads in the corresponding indoor spaces.

The second pump 41 is suspended and accordingly the heat medium does not flow into the second intermediate heat exchanger 31.

(Heating Only Operation)

Next, a heating only operation in which all the indoor units 2a to 2c perform a heating operation will be described. In the heating only operation, the controller 201 causes the four-way valve 12 to switch a refrigerant flow passage such that the heat-source-side refrigerant discharged from the compressor 11 flows toward the check valve 15c. The controller 202 also drives only the second pump 41, suspends the first pump 42, and causes the heat medium flow control devices 45a to 45c to be opened. Further, the controller 202 causes the heat medium flow switching devices 46a to 46c to switch heat medium flow passages such that heat medium flows into the heat medium pipes 6a to 6c, respectively, from the heat medium branching part 55. Furthermore, the controller 202 causes the heat medium flow switching devices 47a to 47c to switch heat medium flow passages such that heat medium flows into the heat medium merging part 56 from the heat medium pipes 7a to 7c, respectively.

The description of the heating only operation provided below is mainly focused on differences from a heating main operation.

First, the flow of the heat-source-side refrigerant in the refrigeration cycle will be described. While the flow of the heat-source-side refrigerant is similar to that in the case of a heating main operation, there are differences in performance of individual devices, as described below.

The first pump 42 is suspended and the heat-source-side refrigerant does not evaporate at the first intermediate heat exchanger 33. The low-temperature and low-pressure, two-phase gas-liquid refrigerant which has flowed into the heat-source-side heat exchanger 13 of the outdoor unit 1 without evaporating at the first intermediate heat exchanger 33, evaporates while receiving heat from air sent by the fan 101, and turns into a low-temperature and low-pressure gas refrigerant.

In the heating only operation, due to the configuration of the refrigeration cycle, the second intermediate heat exchanger 31 and the first intermediate heat exchanger 33 are connected in series, in which condensation of the heat-source-side refrigerant occurs only at the second intermediate heat exchanger 31. However, configuration is not limited to this. That is, the second intermediate heat exchanger 31 and the first intermediate heat exchanger 33 may be configured to be connected in parallel, and condensation of the heat-source-side refrigerant may occur at both the intermediate heat exchangers.

Next, the flow of the heat medium in the heat medium circuit will be described.

At the second intermediate heat exchanger 31, heating energy of a heat-source-side refrigerant is transmitted to the heat medium, and the heated heat medium circulates in the heat medium circuit by the second pump 41. The heat medium pressure-fed by the second pump 41 passes through the heat medium flow passage 50, and flows into the heat medium branching part 55. The heat medium which has been split at the heat medium branching part 55 flows through a heat medium flow passage in which the heat medium flows out of the relay unit 3 via the heat medium flow switching device 46a and flows in the heat medium pipe 6a, a heat medium flow passage in which the heat medium flows out of the relay unit 3 via the heat medium flow switching device 46b and flows in the heat medium pipe 6b, and a heat medium flow passage in which the heat medium flows out of the relay unit 3 via the heat medium flow switching device 46c and flows in the heat medium pipe 6c. The heat medium flowing through the heat medium pipes 6a to 6c flows into the indoor units 2a to 2c, respectively.

The heat medium which has flowed into the indoor units 2a to 2c flows into the use-side heat exchangers 35a to 35c, respectively, and transfers heat to indoor air sent by the fans 102a to 102c. Thus, a heating operation is performed for the corresponding indoor spaces. The heat medium which has flowed out of the use-side heat exchangers 35a to 35c and whose temperature has been lowered, flows out of the indoor units 2a to 2c, respectively, passes through the heat medium pipes 7a to 7c, and flows into the relay unit 3.

The heat medium which has flowed into the relay unit 3 after passing through the heat medium pipes 7a to 7c, flows into the second intermediate heat exchanger 31 via the heat medium flow control devices 45a to 45c, the heat medium flow switching devices 47a to 47c, the heat medium merging part 56, and the heat medium flow passage 51. At this time, the flow rates of the heat medium are controlled by the opening degrees of the heat medium flow control devices 45a to 45c so that the heat medium flows into the use-side heat exchangers 35a to 35c with flow rates which meet required air-conditioning loads in the corresponding indoor spaces.

The first pump 42 is suspended and accordingly the heat medium does not flow into the first intermediate heat exchanger 33.

(Actuator Control in Refrigeration Cycle)

The rotation speed of the compressor 11 is controlled by the controller 201. Specifically, in a heating main operation and a heating only operation, the controller 201 controls the rotation speed of the compressor 11 so that the discharge pressure of the compressor 11 detected by the refrigerant pressure sensor 71 becomes a target pressure, and adjusts the refrigerant flow rate in the refrigeration cycle accordingly. At this time, the controller 201 converts the discharge pressure detected by the refrigerant pressure sensor 71 into a saturation temperature, and preferably controls the discharge pressure so that the saturation temperature becomes around 50 [degrees Centigrade]. In contrast, in a cooling main operation and a cooling only operation, the controller 201 controls the rotation speed of the compressor 11 so that the suction pressure of the compressor 11 detected by the refrigerant pressure sensor 72 becomes a target pressure, and adjusts the refrigerant flow rate of the refrigeration cycle accordingly. At this time, the controller 201 converts the suction pressure detected by the refrigerant pressure sensor 72 into a saturation temperature, and preferably controls the suction pressure so that the saturation temperature becomes around 0 [degrees Centigrade].

The opening degree of the expansion device 32 is controlled by the controller 202. Specifically, in a heating main operation and a heating only operation, the controller 202 converts the condensing pressure of the second intermediate heat exchanger 31 detected by the refrigerant pressure sensor 73 into a saturation temperature. Then, the controller 202 controls the opening degree of the expansion device 32 so that the difference between the saturation temperature and the temperature of the heat-source-side refrigerant on the outflow side of the second intermediate heat exchanger 31 detected by the refrigerant temperature sensor 75, that is, the degree of subcooling, becomes a target value, and adjusts the flow rate of the refrigerant flowing into the second intermediate heat exchanger 31 accordingly. At this time, the controller 202 preferably controls the degree of subcooling to around 3 to 8 [degrees Centigrade]. In contrast, in a cooling main operation and a cooling only operation, the controller 202 controls the opening degree of the expansion device 32 so that the difference between the temperature of the heat-source-side refrigerant on the outflow side of the first intermediate heat exchanger 33 detected by the refrigerant temperature sensor 77 and the temperature of the heat-source-side refrigerant on the inflow side of the first intermediate heat exchanger 33 detected by the refrigerant temperature sensor 76, that is, the degree of superheat, becomes a target value, and adjusts the flow rate of the refrigerant flowing into the first intermediate heat exchanger 33 accordingly. At this time, the controller 202 preferably controls the degree of superheat to around 2 to 5 [degrees Centigrade].

(Actuator Control in Heat Medium Circuit)

The opening degrees of the heat medium flow control devices 45a to 45c are controlled by the controller 202. Specifically, the controller 202 controls the opening degrees of the heat medium flow control devices 45a to 45c so that heat medium temperature differences ΔTw, which are differences between the temperatures of heat medium on the inflow sides of the use-side heat exchangers 35a to 35c detected by the heat medium temperature sensor 81 or the heat medium temperature sensor 82 (the heat medium temperature sensor 81 in the case where the heat medium pressure-fed by the second pump 41 flows in, and the heat medium temperature sensor 82 in the case where the heat medium pressure-fed by the first pump 42 flows in) and the temperatures of heat medium on the outflow sides of the use-side heat exchangers 35a to 35c detected by the heat medium temperature sensors 85a to 85c, respectively, become a target value. Through such a control, the controller 202 adjusts the flow rates of heat medium flowing into the use-side heat exchangers 35a to 35c. At this time, the controller 202 preferably controls the heat medium temperature difference ΔTw to around 5 to 10 [degrees Centigrade].

The rotation speeds of the second pump 41 and the first pump 42 are controlled by the controller 202.

Specifically, the controller 202 adjusts the rotation speed of the second pump 41 so that the one with the largest opening degree out of the heat medium flow control devices 45a to 45c that correspond to those performing a heating operation among the indoor units 2a to 2c, and the second pump 41, is made to have the maximum opening degree. For example, in the case where the indoor units 2a and 2b are performing a heating operation, the opening degree of the heat medium flow control device 45a is 70[%] with respect to the maximum value of 100[%], and the opening degree of the heat medium flow control device 45b is 50[%], the controller 202 determines that the total circulation amount of the heat medium is excessive, and reduces the rotation speed of the second pump 41 so that the opening degree of the heat medium flow control device 45a becomes a stable opening degree, that is, becomes closer to a range where an increase or decrease in the rotation speed of the second pump 41 is unnecessary. At this time, the stable opening degree of the heat medium flow control device 45a is preferably around 90 to 95[%]. In the case where the opening degree of the heat medium flow control device 45a exceeds the stable opening degree, for example, when the opening degree of the heat medium flow control device 45a has reached 100[%], the controller 202 determines that the total circulation amount of the heat medium is insufficient, and increases the rotation speed of the second pump 41 so that the opening degree of the heat medium flow control device 45a becomes closer to the stable opening degree. The controller 202 performs a similar control for the heat medium flow control devices 45a to 45c that correspond to those performing a cooling operation among the indoor units 2a to 2c and the first pump 42. Thus, the controller 202 controls the rotation speeds of the second pump 41 and the first pump 42 such that the opening degrees of the heat medium flow control devices 45a to 45c become maximum, thereby enabling a reduction in the transporting power for the heat medium. As for an indoor unit in suspension out of 2a to 2c, the controller 202 adjusts the opening degree so that the heat medium does not flow into a corresponding heat medium flow control device among the heat medium flow control devices 45a to 45c.

In Embodiment 1, actuators and the like in the outdoor unit 1 are controlled by the controller 201 and actuators and the like in the relay unit 3 are controlled by the controller 202. However, a form is not limited to this. That is, a form in which the controller 201 and the controller 202 are integrated together and one controller (for example, the controller 201) controls actuators and the like in both the outdoor unit 1 and the relay unit 3 may be employed.

(Conditions for Heat Medium to Freeze in First Intermediate Heat Exchanger 33)

When the air-conditioning apparatus according to Embodiment 1 performs a heating main operation, as described above, a low-temperature and low-pressure heat-source-side refrigerant evaporates at the first intermediate heat exchanger 33 and the heat-source-side heat exchanger 13. At this time, the evaporating temperature at which a heat-source-side refrigerant evaporates is greatly affected by the temperature of air that goes through the heat-source-side heat exchanger 13, that is, the outside air temperature. When the outside air temperature is low, then the evaporating temperature becomes low, and accordingly, for example, in the case of the heat medium having water as a major component, the heat medium has a risk of freezing at the first intermediate heat exchanger 33. In the case where part of the heat medium flow passage of the first intermediate heat exchanger 33 is blocked because of the freezing of the heat medium, the water flow rate decreases. When the heat medium flow passage is completely blocked, the volume of the heat medium expands within the heat medium flow passage of the first intermediate heat exchanger 33 and there is a risk of damaging to the first intermediate heat exchanger 33.

Figure 2:
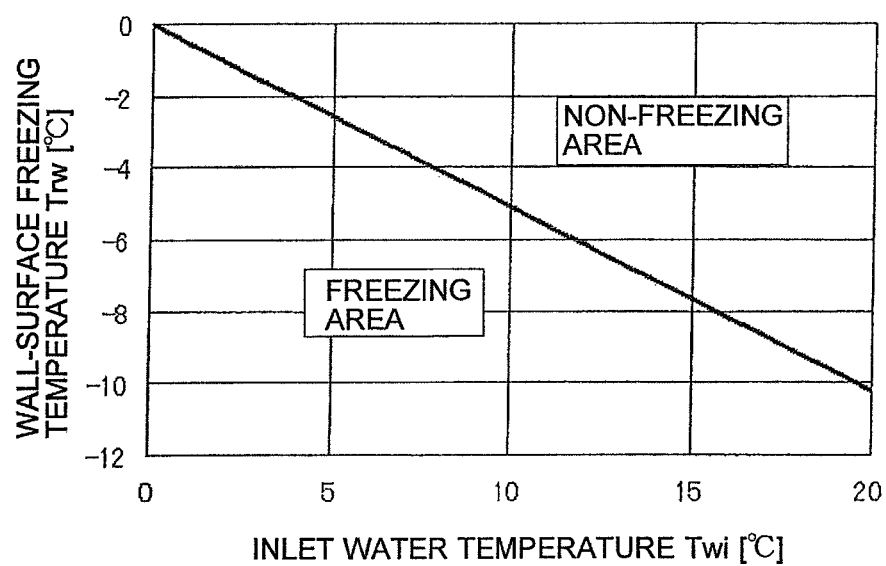
FIG. 2 is a diagram illustrating an example of the relation between a wall-surface freezing temperature Trw and an inlet water temperature Twi of a first intermediate heat exchanger 33 of the air-conditioning apparatus according to Embodiment 1 of the present invention.

FIG. 2 is a diagram illustrating an example of the relation between a wall-surface freezing temperature Trw and an inlet water temperature Twi of the first intermediate heat exchanger 33 of the air-conditioning apparatus according to Embodiment 1 of the present invention. Here, the wall-surface freezing temperature Trw indicates a flow-passage wall-surface temperature of the heat medium flow passage in the first intermediate heat exchanger 33 at or below which the heat medium freezes, and the inlet water temperature Twi indicates the temperature of the heat medium on the inflow side of the first intermediate heat exchanger 33.

FIG. 2 is based on the assumption that water is used as a heat medium and a plate-type heat exchanger is used as the first intermediate heat exchanger 33.

The inlet water temperature Twi may indicate not only the temperature of water as a heat medium but also the temperature of another type of heat medium.

As illustrated in FIG. 2, the upper area of the graph indicates a non-freezing area of the heat medium and the lower area indicates a freezing area of the heat medium. The graph indicates that the higher the inlet water temperature Twi, the lower the wall-surface freezing temperature Trw, making the heat medium hard to freeze. That is, it is possible to calculate the wall-surface freezing temperature Trw based on the inlet water temperature Twi detected by the heat medium temperature sensor 83 and based on the correlation between the inlet water temperature Twi and the wall-surface freezing temperature Trw, as illustrated in FIG. 2, thus enabling to prevent freezing.

(Heat Medium Freeze Prevention Control and Heat Medium Temperature Rise Control)

On the basis of the above conditions on which the heat medium freezes at the first intermediate heat exchanger 33, the air-conditioning apparatus according to Embodiment 1 executes heat medium freeze prevention control (described later with reference to FIG. 3) in which the air-conditioning apparatus determines whether, on the basis of the evaporating temperature of refrigerant and the inlet water temperature Twi at the first intermediate heat exchanger 33, there is a risk of freezing or not. Further, the air-conditioning apparatus according to Embodiment 1 executes, during the heat medium freeze prevention control, heat medium temperature rise control for raising the temperature of the heat medium, thereby causing the heat medium to be less likely to meet the conditions for freezing, after the heat medium freeze prevention control is completed and an ordinary heating main operation is resumed. The heat medium temperature rise control is control for the indoor units 2a to 2c which are performing a cooling operation to raise the temperature of the heat medium using air in air-conditioned spaces.

Figure 3:
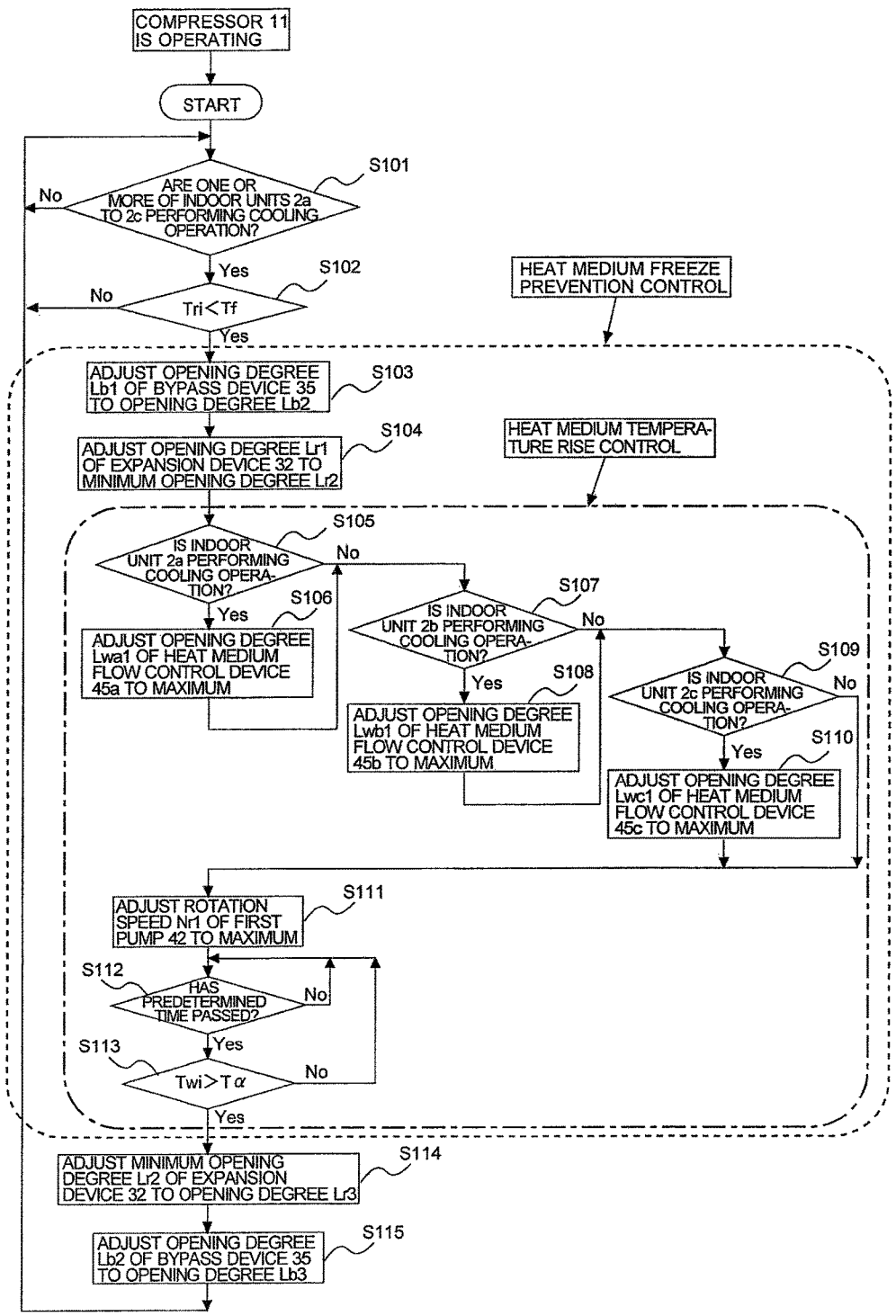
FIG. 3 is a flowchart illustrating heat medium freeze prevention control and heat medium temperature rise control in the air-conditioning apparatus according to Embodiment 1 of the present invention.
Figures 4, 5:
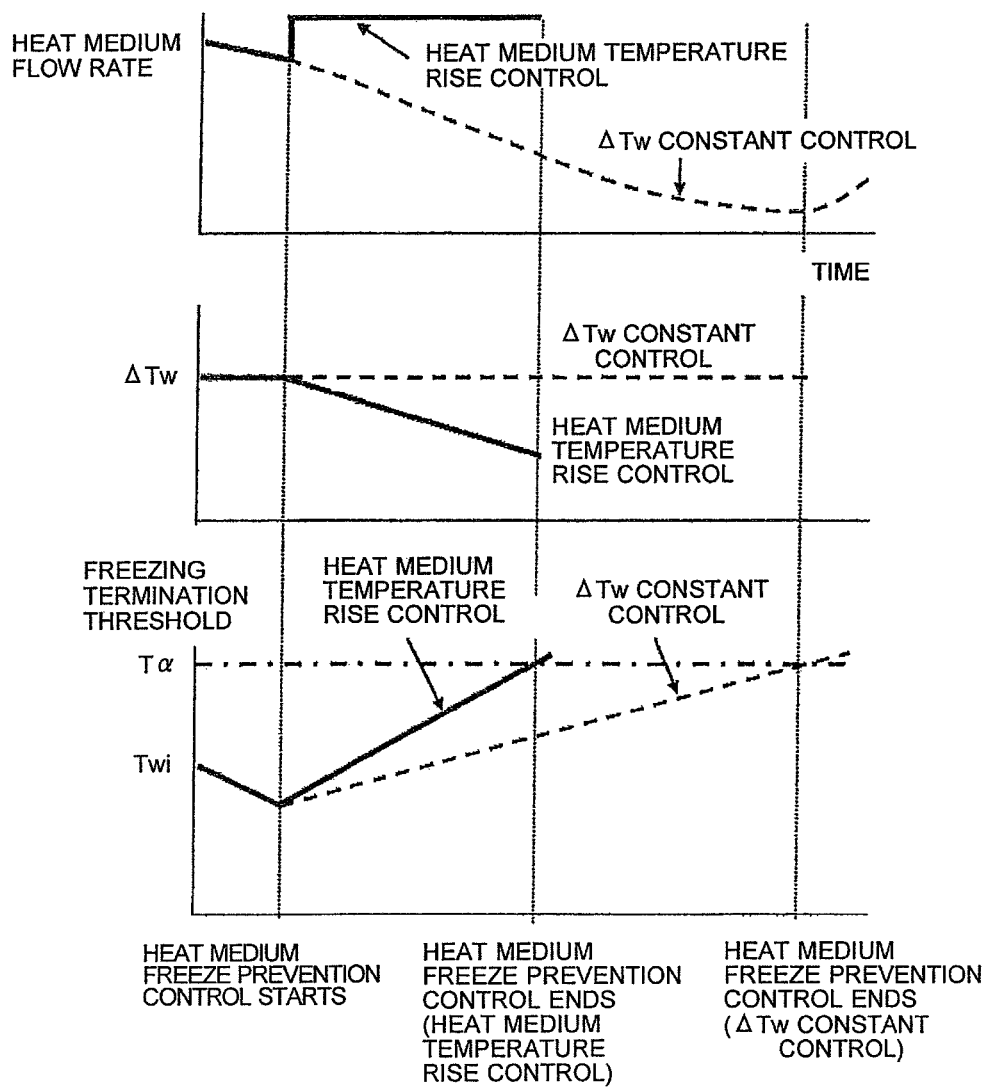
FIG. 4 is a table illustrating a setting example of a heat medium freezing refrigerant temperature Tf with respect to the inlet water temperature Twi in the air-conditioning apparatus according to Embodiment 1 of the present invention.
FIG. 5 is a graph illustrating operational effects of the heat medium temperature rise control in the air-conditioning apparatus according to Embodiment 1 of the present invention.

FIG. 3 is a flowchart illustrating the heat medium freeze prevention control and the heat medium temperature rise control of the air-conditioning apparatus according to Embodiment 1 of the present invention. FIG. 4 is a table illustrating a setting example of the heat medium freezing refrigerant temperature Tf with respect to the inlet water temperature Twi of the air-conditioning apparatus. The heat medium freeze prevention control and the heat medium temperature rise control according to Embodiment 1 will be described with reference to FIG. 3 and FIG. 4 hereinafter. In execution of those controls, it is assumed that the compressor 11 is being driven. In FIG. 4, the heat medium freeze prevention control corresponds to operations in steps S103 to S113, and the heat medium temperature rise control corresponds to steps S105 to S113 in the heat medium freeze prevention control.

(S101)

The controller 202 determines whether at least one or more of the indoor units 2a to 2c are performing a cooling operation or not. When it has been determined that at least one or more of the indoor units 2a to 2c are performing a cooling operation, the controller 202 proceeds to step S102. When it has been determined that at least one or more of the indoor units 2a to 2c are not performing a cooling operation, the controller 202 continues to determine whether at least one or more of the indoor units 2a to 2c are performing a cooling operation or not.

(S102)

The controller 202 determines whether or not the inlet refrigerant temperature Tri, which is the temperature (evaporating temperature) of the heat-source-side refrigerant on the inflow side of the first intermediate heat exchanger 33 detected by the refrigerant temperature sensor 76, is lower than the heat medium freezing refrigerant temperature Tf. When it has been determined that the inlet refrigerant temperature Tri is lower than the heat medium freezing refrigerant temperature Tf, it is determined that the heat medium freeze prevention control is necessary, and the controller 202 proceeds to step S103. When it has been determined that the inlet refrigerant temperature Tri is not lower than the heat medium freezing refrigerant temperature Tf, the controller 202 returns to step S101. Here, it is assumed that the inlet refrigerant temperature Tri is equal to the flow-passage wall-surface temperature of the heat medium flow passage at the first intermediate heat exchanger 33, and the heat medium freezing refrigerant temperature Tf is equal to the wall-surface freezing temperature Trw illustrated in FIG. 2. As illustrated in FIG. 2, since the wall-surface freezing temperature Trw and the inlet water temperature Twi have a correlation, the heat medium freezing refrigerant temperature Tf corresponding to the inlet water temperature Twi is set in advance as illustrated in FIG. 4. Then, the controller 202 may determine the heat medium freezing refrigerant temperature Tf in accordance with the correspondence illustrated in FIG. 4, based on the inlet water temperature Twi detected by the refrigerant temperature sensor 76. For example, when the inlet water temperature Twi is 7 [degrees Centigrade], the heat medium freezing refrigerant temperature Tf is −2.6 [degrees Centigrade]. In reality, the flow-passage wall-surface temperature of the heat medium flow passage at the first intermediate heat exchanger 33 is slightly higher than the inlet refrigerant temperature Tri. However, if the inlet refrigerant temperature Tri is made to be the flow-passage wall-surface temperature, a safer design toward freezing is achieved, thus causing no problems.

The heat medium freezing refrigerant temperature Tf corresponds to a "predetermined refrigerant temperature" of the present invention.

(S103)

The controller 202 adjusts the opening degree of the bypass device 35 at the bypass pipe 36 from the current Lb1 to Lb2. At this time, the controller 202 makes an adjustment such that the flow rate resistance in the case of the opening degree Lb2 becomes equal to the flow passage resistance in the case of an opening degree Lr1 before the expansion device 32 is adjusted to a minimum opening degree Lr2 in step S104, which will be described later. Accordingly, a change in high pressure and low pressure in the refrigeration cycle can be reduced. Then, the controller 202 proceeds to step S104.

(S104)

The controller 202 adjusts the opening degree of the expansion device 32 which allows the heat-source-side refrigerant to flow, from the current Lr1 to the minimum opening degree Lr2 at which the heat-source-side refrigerant is not allowed to flow. Then, the controller 202 proceeds to step S105.

The controller 202 adjusts the opening degree of the expansion device 32 to the minimum opening degree Lr2 so as not to allow the heat-source-side refrigerant to flow. However, the adjustment is not limited to this. The controller 202 may adjust the opening degree so that the flow rate of the heat-source-side refrigerant after the adjustment becomes at least smaller than the flow rate before the adjustment.

(S105)

The controller 202 determines whether the indoor unit 2a is performing a cooling operation or not. When it has been determined that the indoor unit 2a is performing a cooling operation, the controller 202 proceeds to step S106. When it has been determined that the indoor unit 2a is not performing a cooling operation, the controller 202 proceeds to step S107.

(S106)

The controller 202 adjusts the opening degree Lwa1 of the heat medium flow control device 45a to the maximum opening degree. Then, the controller 202 proceeds to step S107.

The controller 202 preferably adjusts the opening degree Lwa1 of the heat medium flow control device 45a to the maximum opening degree. However, the adjustment is not limited to this. The opening degree may be made at least greater than the opening degree Lwa1 before execution of the heat medium temperature rise control.

(S107)

The controller 202 determines whether the indoor unit 2b is performing a cooling operation or not. When it has been determined that the indoor unit 2b is performing a cooling operation, the controller 202 proceeds to step S108. When it has been determined that the indoor unit 2b is not performing a cooling operation, the controller 202 proceeds to step S109.

(S108)

The controller 202 adjusts the opening degree Lwb1 of the heat medium flow control device 45b to the maximum opening degree. Then, the controller 202 proceeds to step S109.

(S109)

The controller 202 determines whether the indoor unit 2c is performing a cooling operation or not. When it has been determined that the indoor unit 2c is performing a cooling operation, the controller 202 proceeds to step S110. When it has been determined that the indoor unit 2c is not performing a cooling operation, the controller 202 proceeds to step S111.

(S110)

The controller 202 adjusts the opening degree Lwc1 of the heat medium flow control device 45c to the maximum opening degree. Then, the controller 202 proceeds to step S111.

(S111)

The controller 202 adjusts the rotation speed Nr1 of the first pump 42 to the maximum speed. Then, the controller 202 proceeds to step S112.

It is assumed that the controller 202 adjusts the rotation speed Nr1 of the first pump 42 to the maximum speed. However, the adjustment is not limited to this. The rotation speed may be made faster than the rotation speed before execution of the heat medium temperature rise control.

(S112)

The controller 202, after adjusting the rotation speed Nr1 of the first pump 42 to the maximum speed, determines whether a predetermined time has passed or not. When it has been determined that the predetermined time has passed, the controller 202 proceeds to step S113. When it has been determined that the predetermined time has not passed, the controller 202 continues to determine whether the predetermined time has passed or not.

(S113)

The controller 202 determines whether the inlet water temperature Twi detected by the heat medium temperature sensor 83 is higher than a threshold Tα or not. When it has been determined that the inlet water temperature Twi is higher than the threshold Tα, the controller 202 proceeds to step S114. When it has been determined that the inlet water temperature Twi is not higher than the threshold Tα, the controller 202 returns to step S112.

The threshold Tα corresponds to a "predetermined heat medium temperature" of the present invention.

(S114)

The controller 202 determines that the heat medium freeze prevention control has been completed, and adjusts the opening degree of the expansion device 32 from the minimum opening degree Lr2 to an opening degree Lr3. At this time, as for the opening degree Lr3 of the expansion device 32, the controller 202 preferably stores the opening degree Lr1 before changing the opening degree of the expansion device 32 in step S104 and adjusts the opening degree Lr3 to be equal to Lr1. Then, the controller 202 proceeds to step S115.

(S115)

The controller 202 adjusts the opening degree Lb2 of the bypass device 35 to an opening degree Lb3. At this time, as for the opening degree Lb3 of the bypass device 35, the controller 202 preferably stores the opening degree Lb1 before changing the opening degree of the bypass device 35 in step S103 and adjusts the opening degree Lb3 to be equal to Lb1. Then, while the controller 202 returns to S101, the controller 202 returns to the operation mode before the heat medium freeze prevention control is performed.

In step S113, the threshold Tα with respect to the inlet water temperature Twi is set higher than an inlet water temperature Twi 0 of the first intermediate heat exchanger 33 that is before commencing the heat medium freeze prevention control. Specifically, the controller 202 preferably stores the inlet water temperature Twi 0 when commencing the heat medium freeze prevention control (for example, step S103) and sets the threshold Tα to be equal to Twi 0+10 [degrees Centigrade] approximately. In this case, for example, when the inlet water temperature Twi 0 is 5 [degrees Centigrade], then the threshold Tα is 15 [degrees Centigrade]. By setting the threshold Tα as mentioned above, it is possible to make the inlet water temperature Twi higher than the wall-surface freezing temperature Trw, thus allowing a prolonged period of time before commencing the heat medium freeze prevention control after resuming an operation mode that is executed before commencing the heat medium freeze prevention control. Alternatively, the maximum value of the threshold Tα is preferably set to approximately 18 [degrees Centigrade].

The threshold Tα is preferably set, when the indoor units 2a to 2c are performing a cooling operation, at or below suction air temperatures detected by the suction air temperature sensors 86a to 86c, that is, at or below a thermo-off temperature. This is because in the heat medium temperature rise control, the heat medium is heated by suction air of the indoor units 2a to 2c and the heat medium temperature cannot be made at or higher than the suction air temperature. Thus, by setting the threshold Tα as mentioned above, in the case where the suction air temperature is low, it is possible to prevent a situation in which the inlet water temperature Twi does not exceed the threshold Tα and the heat medium temperature rise control from is thus not completed.

Alternatively, the threshold Tα may be set based on the suction air temperature of one or more of the indoor units 2a to 2c that are performing a cooling operation. In this case, the controller 202 receives suction temperature information detected by corresponding one or more of the suction air temperature sensors 86a to 86c of the one or more of the indoor units 2a to 2c that are performing a cooling operation. Then, the controller 202 sets the threshold Tα based on the lowest temperature Tamin of the received suction temperature information. For example, in the case where the temperature Tamin is 23 [degrees Centigrade], the controller 202 sets the temperature of the threshold Tα to be lower than the temperature Tamin, for example, 20 [degrees Centigrade]. Thus, by setting the threshold Tα based on the temperature Tamin, it is possible to widen a heating range of the heat medium in the heat medium temperature rise control.

After the completion of the heat medium freeze prevention control, in a heating main operation, the heat medium which circulates in corresponding one or more use-side heat exchangers of one or more of the indoor units 2a to 2c that are performing the cooling operation (corresponding one or more of the use-side heat exchangers 35a to 35c), has a high temperature. Therefore, by adjusting the opening degree of one or more corresponding heat medium flow control devices (corresponding one or more of the heat medium flow control devices 45a to 45c), so that a heat medium temperature difference ΔTw becomes a target value, the heat exchange amount of the corresponding one or more use-side heat exchangers becomes smaller and the opening degree is likely to be reduced accordingly. Thus, the flow rates of heat medium flowing into the corresponding one or more use-side heat exchangers of the one or more of the indoor units 2a to 2c that are performing the cooling operation may be reduced, which causes a reduction in the cooling capacity. Therefore, after the completion of the heat medium freeze prevention control, the controller 202 preferably adjusts the opening degrees of the one or more heat medium flow control devices corresponding to the one or more of the indoor units 2a to 2c that are performing the cooling operation, to the maximum opening degree, at least for a predetermined time. Furthermore, the controller 202 preferably adjusts the rotation speed of the first pump 42 to the maximum rotation speed for the predetermined time.

(Effects of Heat Medium Temperature Rise Control)

FIG. 5 is a graph illustrating operational effects of the heat medium temperature rise control in the air-conditioning apparatus according to Embodiment 1 of the present invention. The effects of the execution of the heat medium temperature rise control in which the opening degrees of the heat medium flow control devices 45a to 45c are set to the maximum opening degrees and the rotation speed of the first pump 42 is set to the maximum rotation speed during the heat medium freeze prevention control, will be described hereinafter with reference to FIG. 5. In the heat medium freeze prevention control, instead of the heat medium temperature rise control described above, control for adjusting the opening degrees of the heat medium flow control devices 45a to 45c and making the heat medium temperature difference ΔTw, which is a difference in the temperature of the heat medium on the inflow and outflow sides of the use-side heat exchangers 35a to 35c (a difference in a heat medium temperature between the entrance and exit of the indoor units 2a to 2c), constant, is called "ΔTw constant control." FIG. 5 illustrates changes of the heat medium flow rate of the first intermediate heat exchanger 33 (top row), the heat medium temperature difference ΔTw (middle row), which is a difference in the temperature of the heat medium between the entrance and exit of the indoor units 2a to 2c, and the inlet water temperature Twi of the first intermediate heat exchanger 33 (bottom row), relative to a time change of the heat medium freeze prevention control from start to end. The solid lines in FIG. 5 indicate the case where the heat medium temperature rise control is performed, while the broken lines indicate the case where the ΔTw constant control is performed.

The description provided below is based on the assumption that the opening degrees of the heat medium flow control devices 45a to 45c are set to the maximum opening degree and the rotation speed of the first pump 42 is set to the maximum rotation speed, as described above. However, they are not necessarily maximum. They may be set to be at least greater in level than the time before the heat medium temperature rise control is performed.

As illustrated in the top row in FIG. 5, in the heat medium temperature rise control, the heat medium flow rate is greater than the flow rate before the heat medium freeze prevention control starts, because the opening degrees of the heat medium flow control devices 45a to 45c are made maximum at the start of the heat medium freeze prevention control and the rotation speed of the first pump 42 is made maximum. When the heat medium freeze prevention control starts, the heat-source-side refrigerant is not flowing into the first intermediate heat exchanger 33. Therefore, the heat medium is not cooled. At this time, if the heat medium circulates through the indoor units 2a to 2c, the heat medium is heated by indoor air, and the temperature of the heat medium gradually rises during the heat medium freeze prevention control, compared to an ordinary operation mode (for example, a heating main operation mode). Because of this, a temperature difference between indoor air and the heat medium becomes smaller at the indoor units 2a to 2c, and the heat exchange amount decreases at the use-side heat exchangers 35a to 35c. Therefore, as described above, in the heat medium temperature rise control, when the opening degrees of the heat medium flow control devices 45a to 45c are made maximum at the start of the heat medium freeze prevention control and the rotation speed of the first pump 42 is made maximum, and the flow rate of the head medium is made constant (see the top row in FIG. 5), the heat medium temperature difference ΔTw decreases as illustrated in the middle row in FIG. 5.

In contrast, as with the ΔTw constant control illustrated in the middle row in FIG. 5, even when the heat medium freeze prevention control starts, if the opening degrees of the heat medium flow control devices 45a to 45c are adjusted such that the heat medium temperature difference ΔTw becomes a target value, the flow rates of the heat medium decrease, as illustrated in the top row in FIG. 5.

As illustrated in the bottom row in FIG. 5, in the case of the heat medium temperature rise control, by making the flow rates of the heat medium flowing into the use-side heat exchangers 35a to 35c greater compared to the ΔTw constant control, it is possible to heat the heat medium more quickly. This enables a time required for the inlet water temperature Twi to reach the threshold Tα to be shortened, and accordingly, the duration of the heat medium freeze prevention control may be shortened.

During the heat medium freeze prevention control, the fans 102a to 102c of the indoor units 2a to 2c which were performing a cooling operation during an ordinary operation mode continue to operate. Thus, the indoor units 2a to 2c are able to continuously preform a cooling operation for cooling indoor air even during the heat medium freeze prevention control.

(Effects of Embodiment 1)

As described above, even in the case where the evaporating temperature of the first intermediate heat exchanger 33 becomes low due to a low outside air temperature or the like and there is a risk of freezing of the heat medium at the first intermediate heat exchanger 33, by performing the heat medium freeze prevention control in Embodiment 1, it is possible to prevent the heat medium at the first intermediate heat exchanger 33 from freezing and to suppress the occurrence of damage to the first intermediate heat exchanger 33.

In the case where the evaporating temperature of the air-conditioning apparatus according to Embodiment 1 is below the freezing point (at or below 0 [degrees Centigrade]), by performing the heat medium freeze prevention control, it is possible to prevent the heat medium at the first intermediate heat exchanger 33 from freezing. This allows water to be used as a heat medium, and an increase in the transporting power for water, which is caused by the use of antifreeze having a high concentration, may be suppressed. Even in the case where antifreeze is used, it is not necessary to increase the concentration of the antifreeze.

Further, in the heat medium freeze prevention control, it is possible, through the heat medium temperature rise control, to more quickly heat the heat medium whose temperature has been lowered, compared to the ΔTw constant control, thereby completing the heat medium freeze prevention control more quickly. Thus, a change in the air outlet temperature at the indoor units 2a to 2c is reduced, which provides users comfort.

Further, in the heat medium freeze prevention control, the heat medium temperature rise control is capable of completing the heat medium freeze prevention control earlier than the ΔTw constant control. Therefore, it is possible to suppress the risk of damaging to the compressor 11 by liquid compression, which is caused by that the evaporation capacity of refrigerant is temporarily lowered during the heat medium freeze prevention control and the liquid refrigerant flows into the compressor 11.

As illustrated in FIG. 3, since the opening degree of the bypass device 35 is opened in step S103 before the opening degree of the expansion device 32 is made minimum in step S104, the refrigeration cycle will not be blocked. Further, since the opening degree of the expansion device 32 is made minimum in step S114 before the opening degree of the bypass device 35 is adjusted in step S115, the refrigeration cycle will not be blocked.

Furthermore, according to Embodiment 1, the temperature of the heat medium is made to increase by air in an air-conditioned space, and accordingly it is not necessary to install a heater or the like.

In Embodiment 1, as illustrated in FIG. 3, it is assumed that the heat medium freezing refrigerant temperature Tf is determined based on the inlet water temperature Twi detected by the heat medium temperature sensor 83 in step S102. However, the temperature determination is not limited to this; the inlet water temperature Twi may be estimated based on the temperature of the heat medium which has flowed out of the first intermediate heat exchanger 33 detected by the heat medium temperature sensor 82. In ordinary operation modes (a cooling main operation mode, a heating main operation mode, a cooling only operation mode, and heating only operation mode), the heat medium temperature difference ΔTw is controlled to be constant. Therefore, the inlet water temperature Twi may be estimated as the sum of a temperature detected by the heat medium temperature sensor 82 and the heat medium temperature difference ΔTw.

In Embodiment 1, during the heat medium freeze prevention control, when it is determined whether the inlet water temperature Twi is greater than the threshold Tα in step S113, the temperature detected by the heat medium temperature sensor 83 is defined as the inlet water temperature Twi. However, the temperature determination is not limited to this. That is, during the heat medium freeze prevention control, little heat-source-side refrigerant flows into the first intermediate heat exchanger 33, and therefore, the heat medium is not cooled. Accordingly, the temperature detected by the heat medium temperature sensor 82 may be estimated to be the inlet water temperature Twi.

The relation between the inlet water temperature Twi and the wall-surface freezing temperature Trw illustrated in FIG. 2 is merely an example. Since the relation varies according to the type of a heat medium, the size of the first intermediate heat exchanger 33, or the flow rate (flow velocity) of a heat medium, the relation is not limited to that illustrated in FIG. 2.

The refrigerant temperature detected by the refrigerant temperature sensor 76 is defined as the evaporating temperature at the first intermediate heat exchanger 33. However, the evaporating temperature is not limited to this. A refrigerant pressure sensor may be installed between the refrigerant outflow side of the expansion device 32 and the low-pressure pipe 5, and the controller 202 may estimate the evaporating temperature by converting the refrigerant pressure detected by the refrigerant pressure sensor into a saturation temperature.

In Embodiment 1, the rotation speed of the first pump 42 may be controlled by the controller 202 and the rotation speed is made maximum in the heat medium temperature rise control. However, the pump rotation speed is not limited to this. A pump with a constant rotation speed may be used as the first pump 42. In this case, by increasing the opening degrees of the heat medium flow control devices 45a to 45c, effects of the heat medium temperature rise control can be obtained.

In the air-conditioning apparatus according to Embodiment 1, the total heat medium flow rate is adjusted by the second pump 41 and the first pump 42, and the flow rates of heat medium in the indoor units 2a to 2c are individually adjusted by the heat medium flow control devices 45a to 45c. However, the configuration is not limited to this. That is, pumps which individually adjust the flow rates of the heat medium in the indoor units 2a to 2c may be provided to the heat medium pipes 6a to 6c or the heat medium pipes 7a to 7c. In this case, by individually increasing the rotation speeds of the pumps corresponding to the indoor units 2a and 2c, effects of the heat medium temperature rise control can be obtained.

In the air-conditioning apparatus according to Embodiment 1, the heat medium freeze prevention control has been described as being effective in a heating main operation in which the heat-source-side heat exchanger 13 functions as an evaporator. Also in the case where the heat-source-side heat exchanger 13 functions as a condenser in a cooling main operation or a cooling only operation, when the evaporating temperature of the heat-source-side refrigerant at the first intermediate heat exchanger 33 temporarily decreases, freezing of the heat medium can be prevented through execution of the heat medium freeze prevention control.

Embodiment 2.

With regard to an air-conditioning apparatus according to Embodiment 2, the description provided below is mainly focused on differences from the air-conditioning apparatus according to Embodiment 1. Regarding the air-conditioning apparatus according to Embodiment 1, an operation for increasing the opening degrees of the heat medium flow control devices 45a to 45c that correspond to the indoor units 2a to 2c that are perform a cooling operation in the heat medium temperature rise control to maximum, has been described. The air-conditioning apparatus according to Embodiment 2 adjusts, based on the suction air temperature, the opening degrees of the heat medium flow control devices 45a to 45c that correspond to the indoor units 2a to 2c that are performing a cooling operation in the heat medium temperature rise control.

(Heat Medium Freeze Prevention Control and Heat Medium Temperature Rise Control)

Figure 6:
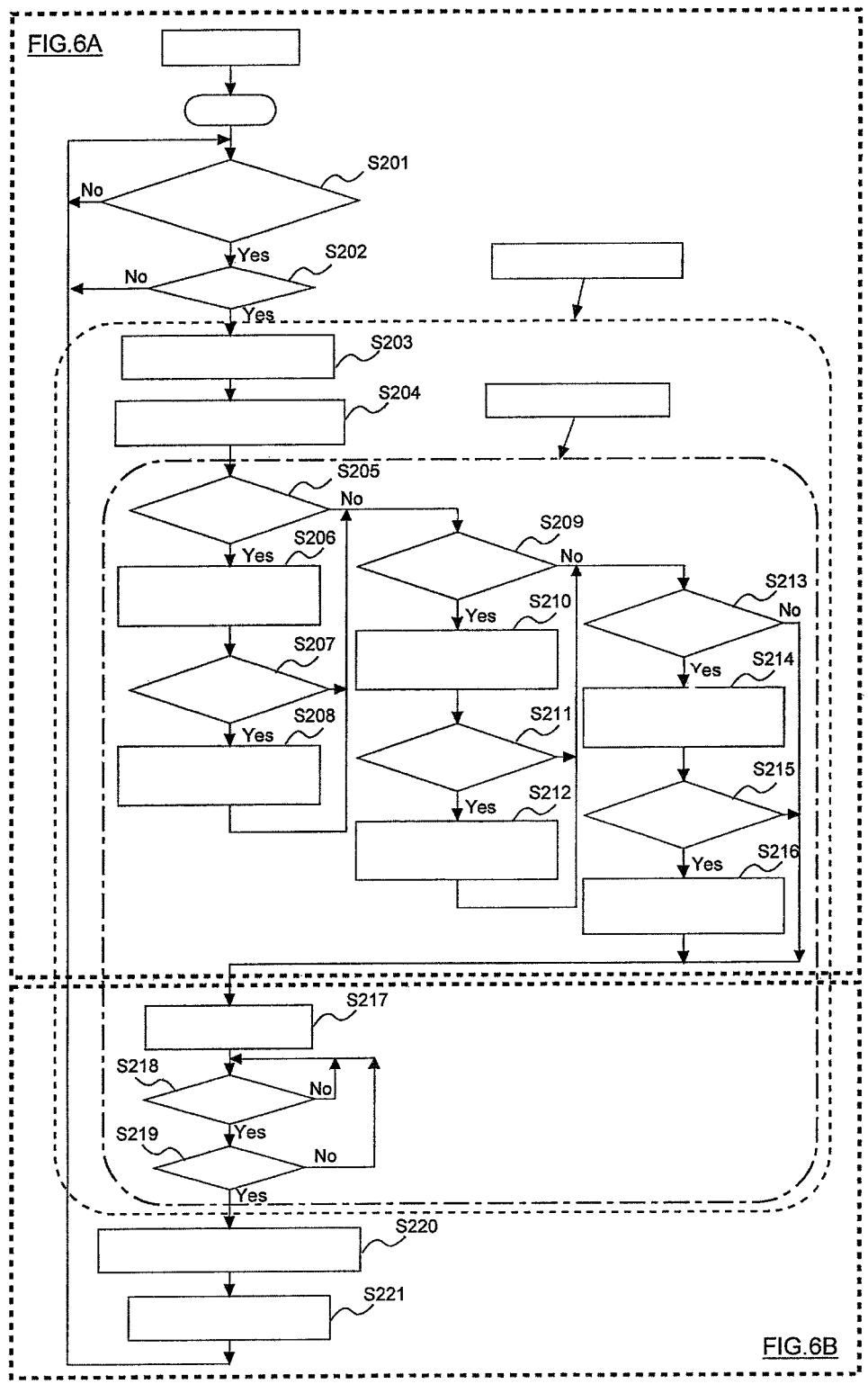
FIG. 6 is a flowchart illustrating heat medium freeze prevention control and heat medium temperature rise control in an air-conditioning apparatus according to Embodiment 2 of the present invention.
Figure 6A:
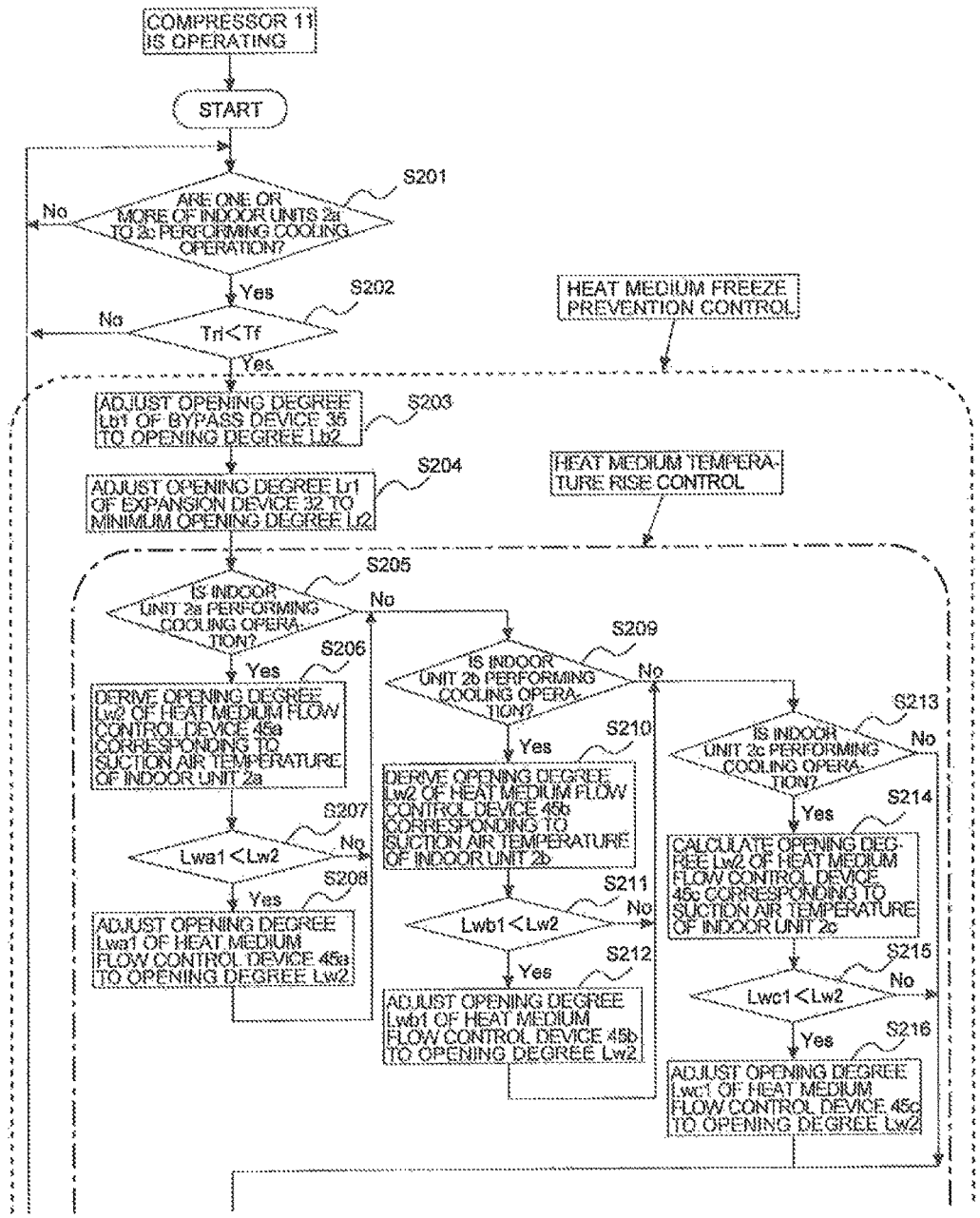
Figure 6B:
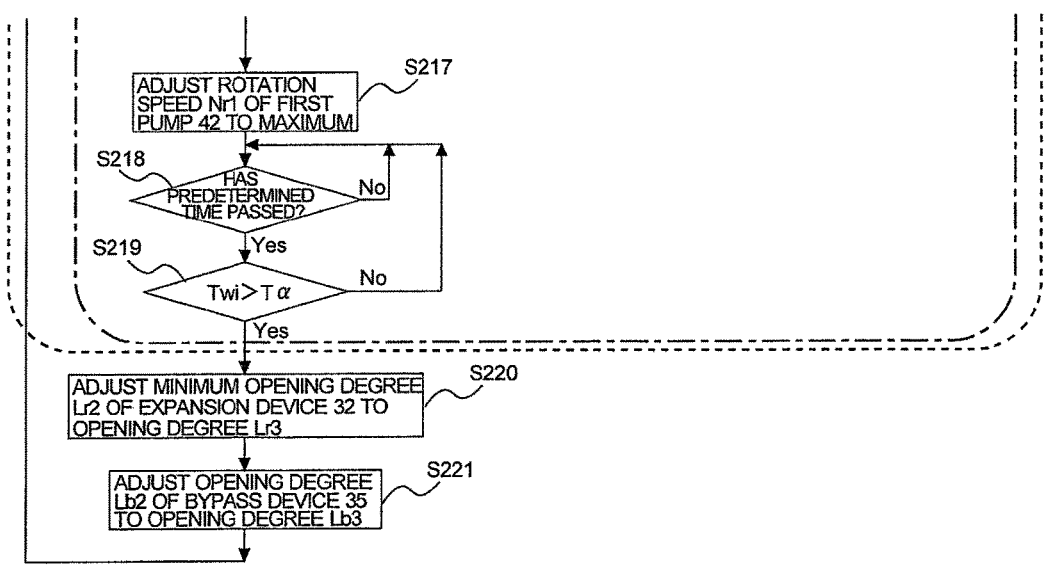
Figure 7:
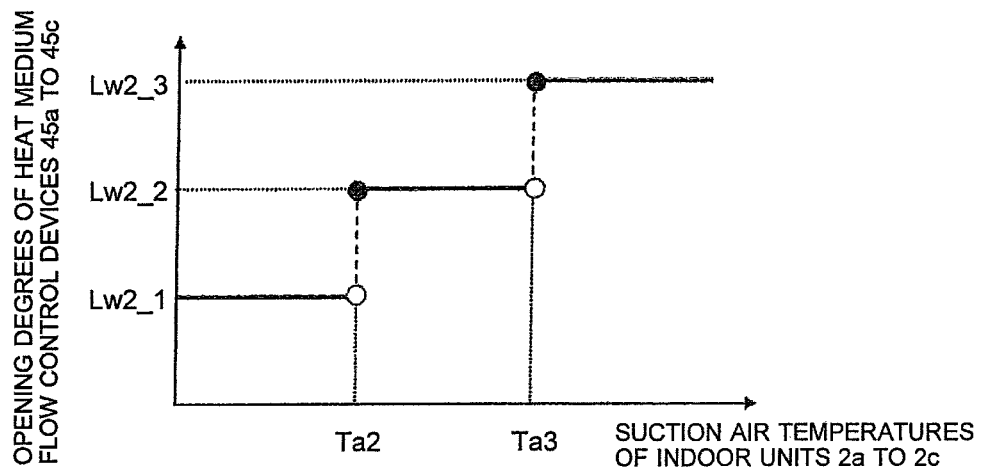
FIG. 7 is a chart illustrating the opening degrees of heat medium flow control devices 45a to 45c corresponding to a suction air temperature in the air-conditioning apparatus according to Embodiment 2 of the present invention.

FIG. 6 is a flowchart illustrating the heat medium freeze prevention control and the heat medium temperature rise control in the air-conditioning apparatus according to Embodiment 2 of the present invention. FIG. 7 is a chart illustrating the opening degrees of the heat medium flow control devices 45a to 45c according to the suction air temperature in the air-conditioning apparatus. The heat medium freeze prevention control and the heat medium temperature rise control according to Embodiment 2 will be described with reference to FIG. 6 and FIG. 7 hereinafter. In execution of those controls, it is assumed that the compressor 11 is operating. In FIG. 6, the heat medium freeze prevention control corresponds to operations in steps S203 to S219, and the heat medium temperature rise control corresponds to steps S205 to S219 in the heat medium freeze prevention control.

(S201-S204)

S201 to S204 are similar to steps S101 to S104 illustrated in FIG. 3 in Embodiment 1.

(S205)

The controller 202 determines whether the indoor unit 2a is performing a cooling operation or not. When it has been determined that the indoor unit 2a is performing a cooling operation, the controller 202 proceeds to step S206. When it has been determined that the indoor unit 2a is not performing a cooling operation, the controller 202 proceeds to step S209.

(S206)

The controller 202, based on the suction air temperature of the indoor unit 2a detected by the suction air temperature sensor 86a and the correspondence between the suction air temperature and the opening degree of the heat medium flow control device 45a illustrated in FIG. 7, derives an opening degree Lw2 of the heat medium flow control device 45a. The opening degree Lw2, as illustrated in FIG. 7, is set larger (Lw2_1, Lw2_2, Lw2_3, . . . ) as the suction air temperature becomes higher (Ta2, Ta3, . . . ) For example, the controller 202, in the case where the suction air temperature is Ta2≤Ta<Ta3, derives Lw2_2 as the opening degree Lw2. Then, the controller 202 proceeds to step S207.

(S207)

The controller 202 determines whether the current opening degree Lwa1 of the heat medium flow control device 45a is smaller than the opening degree Lw2 or not. When it has been determined that the opening degree Lwa1 is smaller than the opening degree Lw2, the controller 202 proceeds to step S208. When it has been determined that the opening degree Lwa1 is not smaller than the opening degree Lw2, the controller 202 proceeds to step S209.

(S208)

The controller 202 adjusts the current opening degree Lwa1 of the heat medium flow control device 45a to the opening degree Lw2. Then, the controller 202 proceeds to step S209.

(S209)

The controller 202 determines whether the indoor unit 2b is performing a cooling operation or not. When it has been determined that the indoor unit 2b is performing a cooling operation, the controller 202 proceeds to step S210. When it has been determined that the indoor unit 2b is not performing a cooling operation, the controller 202 proceeds to step S213.

(S210)

The controller 202, based on the suction air temperature of the indoor unit 2b detected by the suction air temperature sensor 86b and the correspondence between the suction air temperature and the opening degree of the heat medium flow control device 45b illustrated in FIG. 7, derives the opening degree Lw2 of the heat medium flow control device 45b. Then, the controller 202 proceeds to step S211.

(S211)

The controller 202 determines whether the current opening degree Lwb1 of the heat medium flow control device 45b is smaller than the opening degree Lw2 or not. When it has been determined that the opening degree Lwb1 is smaller than the opening degree Lw2, the controller 202 proceeds to step S212. When it has been determined that the opening degree Lwb1 is not smaller than the opening degree Lw2, the controller 202 proceeds to step S213.

(S212)

The controller 202 adjusts the current opening degree Lwb1 of the heat medium flow control device 45b to the opening degree Lw2. Then, the controller 202 proceeds to step S213.

(S213)

The controller 202 determines whether the indoor unit 2c is performing a cooling operation or not. When it has been determined that the indoor unit 2c is performing a cooling operation, the controller 202 proceeds to step S214. When it has been determined that the indoor unit 2c is not performing a cooling operation, the controller 202 proceeds to step S217.

(S214)

The controller 202, based on the suction air temperature of the indoor unit 2c detected by the suction air temperature sensor 86c and the correspondence between the suction air temperature and the opening degree of the heat medium flow control device 45c illustrated in FIG. 7, derives the opening degree Lw2 of the heat medium flow control device 45c. Then, the controller 202 proceeds to step S215.
(S215)
The controller 202 determines whether the current opening degree Lwc1 of the heat medium flow control device 45c is smaller than the opening degree Lw2 or not. When it has been determined that the opening degree Lwc1 is smaller than the opening degree Lw2, the controller 202 proceeds to step S216. When it has been determined that the opening degree Lwc1 is not smaller than the opening degree Lw2, the controller 202 proceeds to step S217.
(S216)
The controller 202 adjusts the current opening degree Lwc1 of the heat medium flow control device 45c to the opening degree Lw2. Then, the controller 202 proceeds to step S217.
(S217-S221)
S217 to S221 are similar to steps S111 to S115 illustrated in FIG. 3 in Embodiment 1.

In step S206, step S210, and step S214, as illustrated in FIG. 7, it is assumed that as the suction air temperatures of the indoor units 2a to 2c increases, the opening degrees of the heat medium flow control devices 45a to 45c increase in a stepwise manner. However, the operation is not limited to this. That is, as the suction air temperatures increase, the opening degrees of the heat medium flow control devices 45a to 45c may increase continuously.
(Effects of Embodiment 2)
By performing a refrigerant operation as in the above-described heat medium temperature rise control and increasing the opening degrees of the heat medium flow control devices 45a to 45c more as the suction air temperatures of the indoor units 2a to 2c become higher, it is possible to increase the temperature of the heat medium more effectively.

When, for example, the suction air temperature of the indoor unit 2a is relatively low, the capacity of the use-side heat exchanger 35a for heating the heat medium decreases. At this time, by decreasing the opening degree of the heat medium flow control device 45a and reducing the flow rate of the heat medium, energy consumption of the first pump 42 can be reduced.

The same applies to the case with the indoor units 2a and 2b and the heat medium flow control devices 45b and 45c.

When, for example, the suction air temperature of the indoor unit 2a is relatively high, the temperature of the heat medium which returns to the first intermediate heat exchanger 33 from the indoor unit 2a is high, and by increasing the opening degree of the heat medium flow control device 45a, the inlet water temperature Twi can be raised higher than the threshold Tα more quickly.

The same applies to the case with the indoor units 2b and 2c and the heat medium flow control devices 45b and 45c.

Additionally, for example, when the suction air temperature of the indoor unit 2a is relatively low, by decreasing the opening degree of the heat medium flow control device 45a, excessive cooling of air in an air-conditioned space can be suppressed, which provides users comfort.

The same applies to the case with the indoor units 2b and 2c and the heat medium flow control devices 45b and 45c.
Embodiment 3
With regard to an air-conditioning apparatus according to Embodiment 3, the description provided below is mainly focused on differences from the air-conditioning apparatus according to Embodiment 1. The air-conditioning apparatus according to Embodiment 3 performs, in the heat medium temperature rise control, mixing valve opening degree control for mixing the heat medium which has flowed out of an indoor unit that is performing a cooling operation with the heat medium which has flowed out of an indoor unit that is performing a heating operation. Specifically, by using the heat medium flow switching devices 47a to 47c, heat medium on both sides are mixed together.
(On Mixing Ratios αm of Heat Medium Flow Switching Devices 47a to 47c and Opening Degree Control)
FIG. 8 is a schematic diagram of the heat medium flow switching devices 47a to 47c of the air-conditioning apparatus according to Embodiment 3 of the present invention, and FIG. 9 is a chart illustrating flow rate characteristics of the heat medium flow switching devices 47a to 47c.

Figure 8:
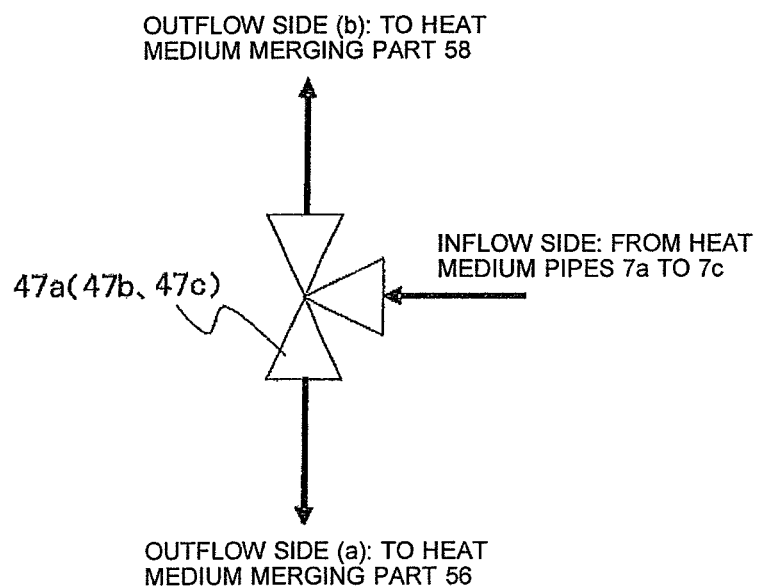
FIG. 8 is a schematic diagram illustrating heat medium flow switching devices 47a to 47c of an air-conditioning apparatus according to Embodiment 3 of the present invention.

As illustrated in FIG. 8, in the heat medium flow switching devices 47a to 47c, the side into which heat medium which has passed through the heat medium pipes 7a to 7c from the indoor units 2a to 2c flow, is referred to as an "inflow side," the side from which heat medium flows out toward the heat medium branching part 56 in order that the heat medium flows to the second intermediate heat exchanger 31, is referred to as an "outflow side (a)," and the side from which heat medium flows out toward the heat medium merging part 58 in order that the heat medium flows to the first intermediate heat exchanger 33, is referred to as an "outflow side (b)."

Figure 9:
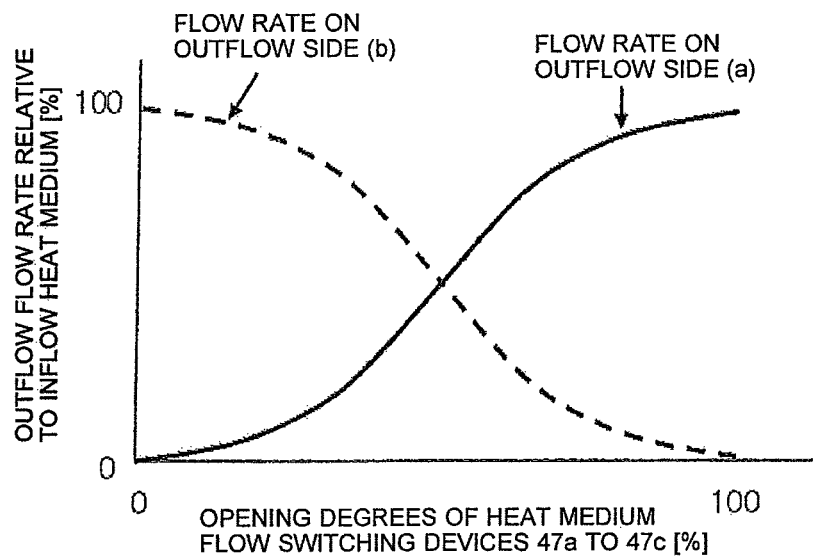
FIG. 9 is a chart illustrating the flow rate characteristics of the heat medium flow switching devices 47a to 47c of the air-conditioning apparatus according to Embodiment 3 of the present invention.

In the flow rate characteristics in FIG. 9, changes in the flow rates of heat medium on the outflow side (a) and the outflow side (b) relative to the opening degrees of the heat medium flow switching devices 47a to 47c, are illustrated. For example, in the case where the opening degree of the heat medium flow switching devices 47a to 47c is 0[%], the heat medium does not flow out of the outflow side (a), and the heat medium which has flowed in through the inflow side flows out of the outflow side (b) completely. Further, in the case where the opening degree is 50[%], the flow rate of the heat medium which flows out of the outflow side (a) and the flow rate of the heat medium which flows out of the outflow side (b) are the same. Furthermore, in the case where the opening degree is 100[%], the heat medium does not flow out of the outflow side (b), and the heat medium which has flowed in through the inflow side flows out of the outflow side (a) completely. That is, if the indoor units 2a to 2c are performing a heating operation, the opening degree is 100 [%]. If the indoor units 2a to 2c are performing a cooling operation, the opening degree is 0[%]. Here, it is assumed that the flow rate characteristics of the heat medium flow switching devices 47a to 47c are all the same.

Here, it is assumed that, for example, the indoor unit 2a is performing a cooling operation and the indoor units 2b and 2c are performing a heating operation. Then, the flow rate of the heat medium flowing into the indoor unit 2a is represented by Gc [L/min] and the total flow rate of heat medium flowing into the indoor units 2b and 2c is represented by Gh [L/min]. At this time, the flow rate of the heat medium flowing into the first intermediate heat exchanger 33 is represented by Gc [L/min], and the flow rate of the heat medium flowing into the second intermediate heat exchanger 31 is represented by Gh [L/min]. Here, a circuit through which the heat medium flows, by the first pump 42, into the first intermediate heat exchanger 33 from an indoor unit (in this case, the indoor unit 2a) that is performing a cooling operation is referred to as a cooling circulation circuit, and a circuit through which the heat medium flows, by the second pump 41, into the second intermediate heat exchanger 31 from an indoor unit (in this case, the indoor units 2b and 2c) that is performing a heating operation is referred to as a heating circulation circuit.

When the mixing ratio of the flow rate Gh [L/min] to the flow rate Gc [L/min] is represented by σm, the flow rate of the heat medium which flows into the cooling circulation circuit from the heating circulation circuit via the heat medium flow switching devices 47b and 47c is represented by σm×Gc [L/min]. Here, in order to keep the total amount of heat medium held by each of the cooling circulation circuit and the heating circulation circuit unchanged, a heat medium of the same flow rate of σm×Gc [L/min] flows into the heating circulation circuit from the cooling circulation circuit via the heat medium flow switching device 47a. That is, at the heat medium flow switching device 47a, a heat medium of the flow rate Gc [L/min] flows in through the inflow side, a heat medium of σm×Gc [L/min] flows out of the outflow side (a), and a heat medium of (1−σm)×Gc [L/min] flows out of the outflow side (b). Further, at the heat medium flow switching devices 47b and 47c, a heat medium of the total flow rate Gh [L/min] flows in through the inflow side, a heat medium of the total flow rate of Gh−σm×Gc [L/min] flows out of the outflow side (a), and a heat medium of the total flow rate of σm×Gc [L/min] flows out of the outflow side (b).

Next, a method for determining the mixing ratio σm of the flow rate Gh [L/min] to the flow rate Gc [/L/min] will be described.

A heat medium which has flowed out of the indoor unit 2a that is performing a cooling operation, which flows into the first intermediate heat exchanger 33, and which has the inlet water temperature Twi [degrees Centigrade], is mixed with heat medium which has flowed out of the indoor units 2b and 2c that is performing a heating operation and which has a temperature Th [degrees Centigrade]. After the mixture, a temperature Tm [degrees Centigrade] of the mixed heat medium is expressed by the following equation (1). Here, the temperature Th [degrees Centigrade] is calculated based on the temperatures of heat medium detected by the heat medium temperature sensors 85a to 85c. In Embodiment 3, since the indoor units 2b and 2c are performing a heating operation, the average of temperatures of heat medium detected by the heat medium temperature sensors 85a to 85c may be defined as the temperature Th [degrees Centigrade].

$$Tm=(1-\sigma m)\times Twi+\sigma m\times Th \quad (1)$$

Here, as in Embodiment 1, the threshold Tα [degrees Centigrade] is set, for example, to be equal to Twi 0+10 [degrees Centigrade] approximately, with respect to the inlet water temperature Twi 0 [degrees Centigrade] of the first intermediate heat exchanger 33 before the heat medium freeze prevention control is commenced. Such a mixing ratio σm that Tm=Tα is expressed by the following equation (2).

$$\sigma m=(T\alpha-Twi0)/(Th-Twi0) \quad (2)$$

For example, when the inlet water temperature Twi 0 [degrees Centigrade] of the first intermediate heat exchanger 33 before the heat medium freeze prevention control is commenced is set to 5 [degrees Centigrade] and the temperature Th [degrees Centigrade] of heat medium which has flowed out of the indoor units 2b and 2c that is performing a heating operation is 40 [degrees Centigrade], the mixing ratio σm is approximately 0.286.

Figure 10:
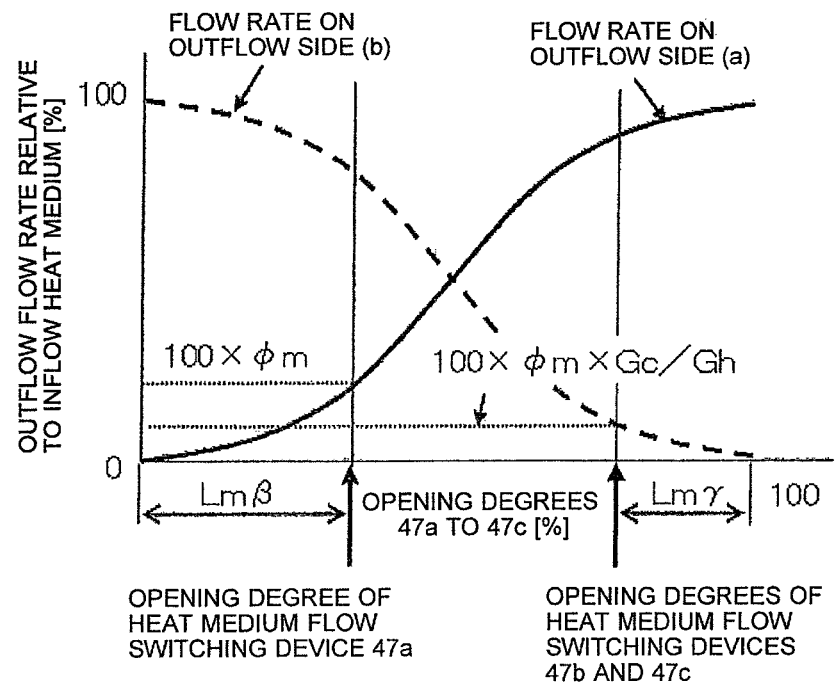
FIG. 10 is a chart illustrating the opening degrees of the heat medium flow switching devices 47a to 47c in the case of a mixing ratio σm in the air-conditioning apparatus according to Embodiment 3 of the present invention.

FIG. 10 is a chart illustrating the opening degrees of the heat medium flow switching devices 47a to 47c in the case of the mixing ratio σm in the air-conditioning apparatus according to Embodiment 3 of the present invention.

It is assumed that the controller 202 stores in advance data of flow rate characteristics of the outflow side (a) and the outflow side (b) relative to the opening degrees [%] of the heat medium flow switching devices 47a to 47c, as illustrated in FIG. 9 and FIG. 10. As described above, an operation of the controller 202 causing the heat medium of a flow rate of σm×Gc [L/min] to flow out of the outflow side (a) of the heat medium flow switching device 47a is equal to an operation of the controller 202 causing the heat medium of 100×σm[%] of the flow rate Gc [L/min] flowing in through the inflow side to flow out of the outflow side (a). Here, the controller 202, based on the stored data of the flow rate characteristics illustrated in FIG. 9 and FIG. 10, may derive an opening degree Lmβ of the heat medium flow switching device 47a to obtain an outflow rate of 100×σm [%] from the outflow side (a).

In contrast, when the total flow ratio of flowing from the outflow sides (b) of the two heat medium flow switching devices 47b and 47c into the cooling circulation circuit is represented by σh, since σh×Gh [L/min] is equal to σm×Gc [L/min], the following equation (3) can be derived.

$$\sigma h=\sigma m\times Gc/Gh \quad (3)$$

Here, when it is assumed that the flow rates of heat medium flowing into the heat medium flow switching devices 47b and 47c are equal to the flow rate of outflowing heat medium, the flow rate of the heat medium which flows out of the outflow side (a) is represented by (1−σh)×Gh/2 and the flow rate of the heat medium which flows out of the outflow side (b) is represented by σh×Gh/2. Further, as described above, causing the heat medium of a flow rate of σm×Gc [L/min] to flow out of the outflow side (b) of the heat medium flow switching devices 47b and 47c is equal to causing the heat medium of 100×σh[%] of the flow rate Gh [L/min] flowing in through the inflow side to flow out of the outflow side (b). The expression 100×σh [%] is, based on the above equation (3), can be converted into 100×σm×Gc/Gh [%]. Here, the controller 202, based on the stored data of the flow rate characteristics illustrated in FIG. 9 and FIG. 10, may derive 100−Lmγ[%], which is the opening degrees of the heat medium flow switching devices 47b and 47c for obtaining an outflow rate of 100×σm×Gc/Gh[%] from the outflow side (b).

As described above, since the controller 202 adjusts the opening degrees of the heat medium flow switching devices 47a to 47c, it is possible to set the mixing ratio of the heat medium to such a mixing ratio σm as expressed by the above equation (2).

Further, the ratio of the flow rate Gc [L/min] of the heat medium flowing into the inflow side of the heat medium flow switching device 47a to the total flow rate Gh [L/min] of heat medium flowing into the inflow sides of the heat medium flow switching devices 47b and 47c is equal to the ratio of the rated capacity of the indoor unit 2a that is performing a cooling operation to the total rated capacity of the indoor units 2b and 2c that are performing a heating operation. Here, when the rated capacity of the indoor unit 2a (total value of cooling capacity) is represented ΣQc and the rated capacity of the indoor units 2b and 2c (total value of heating capacity) is represented by ΣQh, a relation of the following equation (4) can be derived.

$$Gc/Gh=\Sigma Qc/\Sigma Qh \quad (4)$$

Therefore, when the controller 202 stores in advance the rated capacity of the indoor units 2a to 2c and grasps individual operational performances of the indoor units 2a to 2c, it is possible to derive the opening degrees of the heat medium flow switching devices 47a to 47c by the above-described method.

(Heat Medium Temperature Rise Control and Mixing Valve Opening Degree Control)

Figure 11:
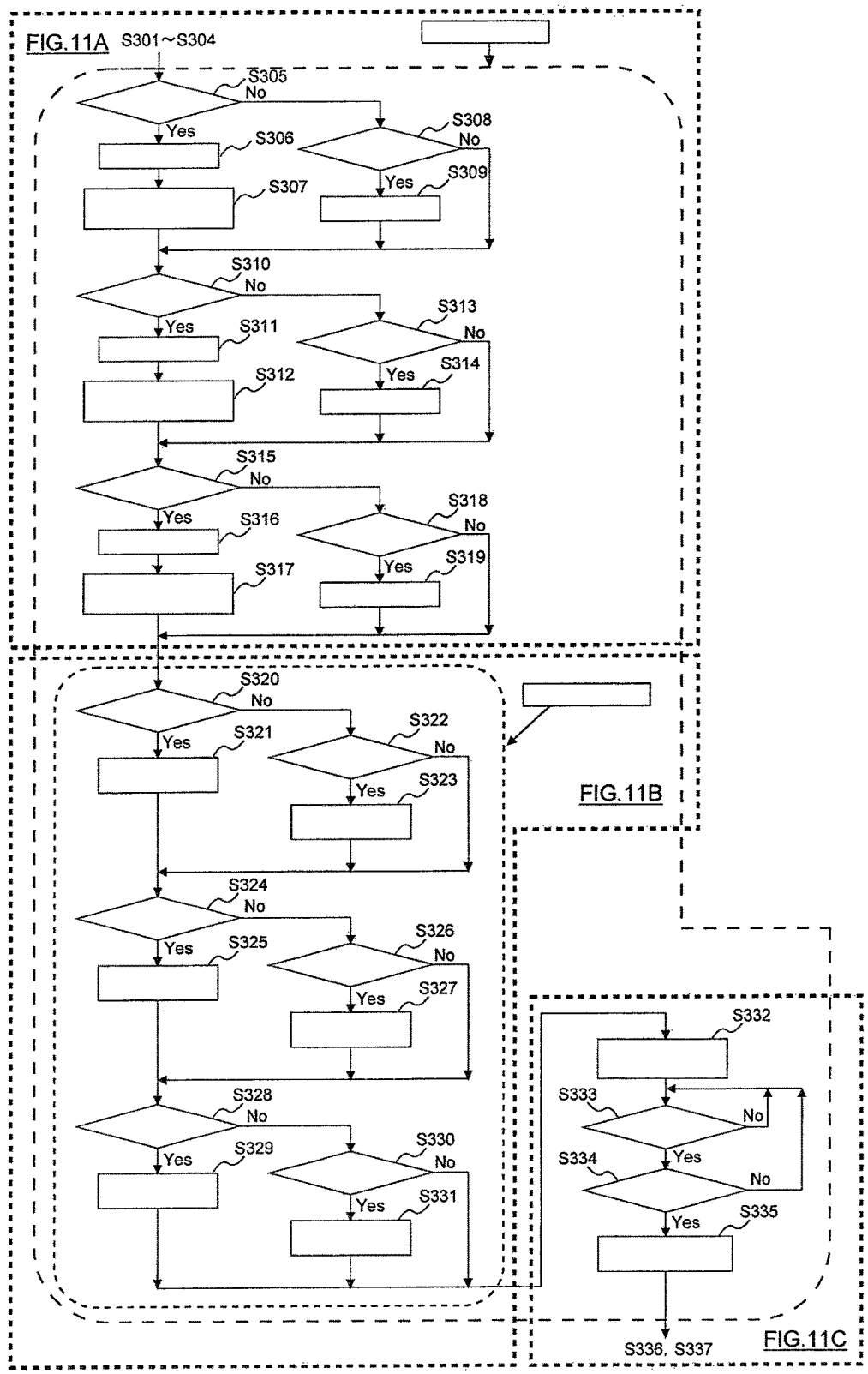
FIG. 11 is a flowchart illustrating heat medium temperature rise control and mixing valve opening degree control in heat medium freeze prevention control in the air-conditioning apparatus according to Embodiment 3 of the present invention.
Figure 11B:
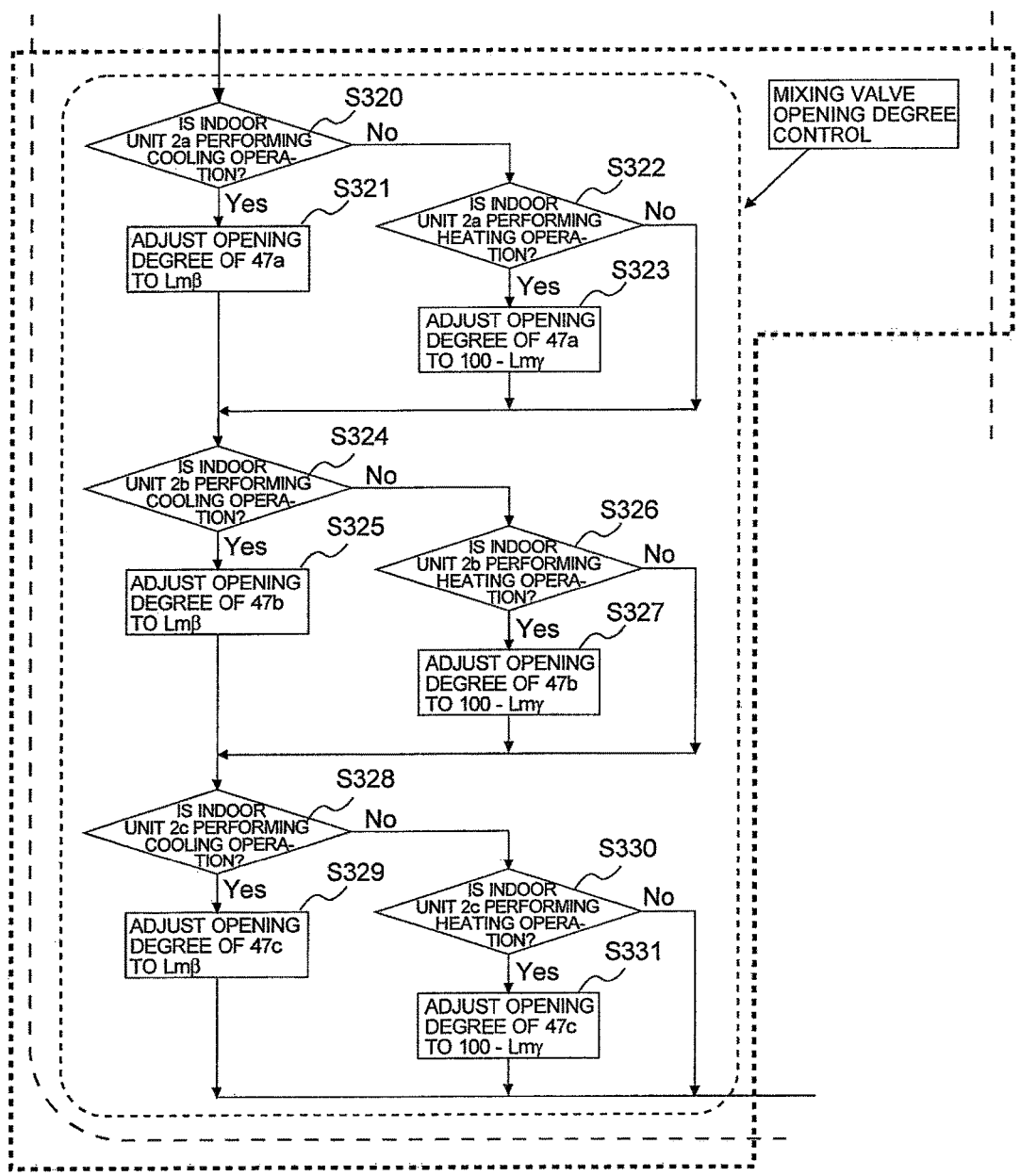
Figure 11C:
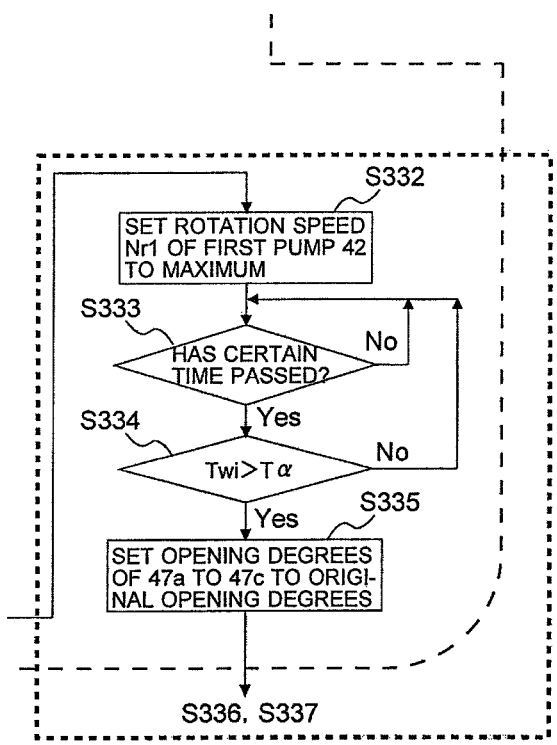

FIG. 11 is a flowchart illustrating heat medium temperature rise control and mixing valve opening degree control in the heat medium freeze prevention control of the air-conditioning apparatus according to Embodiment 3 of the present invention. In FIG. 11, only the flow of the heat medium temperature rise control in the heat medium freeze prevention control is illustrated. The heat medium temperature rise control and the mixing valve opening degree control according to Embodiment 3 will be described with reference to FIG. 11 hereinafter. In execution of those controls, it is assumed that the compressor 11 is being driven, and the controller 202 resets the total cooling capacity value $\Sigma Qc$ and the total heating capacity value $\Sigma Qh$ to zero. In FIG. 11, the heat medium temperature rise control corresponds to operations in steps S305 to S335, and the mixing valve opening degree control corresponds to steps S320 to S331.

(S301-S304)

The details of steps S301 to S304 not illustrated in the drawing are similar to steps S101 to S104 illustrated in FIG. 3 in Embodiment 1.

(S305)

The controller 202 determines whether the indoor unit 2a is performing a cooling operation or not. When it has been determined that the indoor unit 2a is performing a cooling operation, the controller 202 proceeds to step S306. When it has been determined that the indoor unit 2a is not performing a cooling operation, the controller 202 proceeds to step S308.

(S306)

The controller 202 adds the cooling capacity of the indoor unit 2a that is performing a cooling operation to the total cooling capacity value $\Sigma Qc$. Then, the controller 202 proceeds to step S307.

(S307)

The controller 202 adjusts the opening degree Lwa1 of the heat medium flow control device 45a to maximum. Then, the controller 202 proceeds to step S310.

(S308)

The controller 202 determines whether the indoor unit 2a is performing a heating operation or not. When it has been determined that the indoor unit 2a is performing a heating operation, the controller 202 proceeds to step S309. When it has been determined that the indoor unit 2a is not performing a heating operation, the controller 202 proceeds to step S310.

(S309)

The controller 202 adds the heating capacity of the indoor unit 2a that is performing a heating operation to the total heating capacity value $\Sigma Qh$. Then, the controller 202 proceeds to step S310.

(S310-S319)

The controller 202 performs operations similar to steps S305 to S309 on the indoor units 2b and 2c.

The controller 202 calculates the mixing ratio σm, which is the basis for setting the opening degrees of the heat medium flow switching devices 47a to 47c, using the equation (2) and, for example, in step S317 or step S319. This is possible because at this stage the controller 202 has grasped whether the indoor units 2a to 2c are performing either a cooling operation or a heating operation. The controller 202, based on the calculated mixing ratio σm, is capable of deriving the opening degrees Lmβ[%] of the heat medium flow switching devices 47a to 47c that correspond to a cooling operation. Further, the controller 202, based on the calculated mixing ratio σm and the calculated total cooling capacity value $\Sigma Qc$ and total heating capacity value $\Sigma Qh$, is capable of deriving the opening degrees 100−Lmγ [%] of the heat medium flow switching devices 47a to 47c that correspond to a heating operation.

(S320)

The controller 202 determines whether the indoor unit 2a is performing a cooling operation or not. When it has been determined that the indoor unit 2a is performing a cooling operation, the controller 202 proceeds to step S321. When it has been determined that the indoor unit 2a is not performing a cooling operation, the controller 202 proceeds to step S322.

(S321)

The controller 202 adjusts the opening degree of the heat medium flow control device 47a to the opening degree Lmβ[%]. Then, the controller 202 proceeds to step S324.

(S322)

The controller 202 determines whether the indoor unit 2a is performing a heating operation or not. When it has been determined that the indoor unit 2a is performing a heating operation, the controller 202 proceeds to step S323. When it has been determined that the indoor unit 2a is not performing a heating operation, the controller 202 proceeds to step S324.

(S323)

The controller 202 adjusts the opening degree of the heat medium flow control device 47a to an opening degree (100−Lmγ)[%]. Then, the controller 202 proceeds to step S324.

(S324-S331)

The controller 202 performs operations similar to steps S320 to S323 for the indoor units 2b and 2c and the heat medium flow switching devices 47b and 47c.

(S332-S334)

Steps S332 to S334 are similar to steps S111 to S113 illustrated in FIG. 3 in Embodiment 1.

(S335)

The controller 202 resets the opening degrees of the heat medium flow switching devices 47a to 47c to the previous opening degrees before making an adjustment, either in step S321, step S323, step S325, step S327, step S329 or step S331.

(S336, S337)

The details of steps S336 and S337 not illustrated in the drawing are similar to steps S114 and S115, respectively, illustrated in FIG. 3 in Embodiment 1.

In the above-mentioned mixing valve opening degree control, through adjustment made by the controller 202 on the opening degrees of the heat medium flow switching devices 47a to 47c, the heat medium of a high temperature from the heating circulation circuit is mixed into the cooling circulation circuit. However, the method is not limited to this. That is, the controller 202 may mix the heat medium heated by the second intermediate heat exchanger 31 in the heating circulation circuit, through adjustment of the opening degrees of the heat medium flow switching devices 46a to 46c, into the cooling circulation circuit. The opening degrees of the heat medium flow switching devices 46a to 46c and the mixing ratio in this case can be derived by applying the above-described method.

The controller 202, during the heat medium temperature rise control, may adjust the opening degrees of the heat medium flow switching devices 47a to 47c on the basis of the inlet water temperature Twi [degrees Centigrade] detected by the heat medium temperature sensor 83.

In step S334, it is assumed that the sensor that detects the inlet water temperature Twi [degrees Centigrade] of the first intermediate heat exchanger 33 for determining the completion of the heat medium temperature rise control is the heat medium temperature sensor 83. However, the sensor is not limited to this. That is, heat medium temperature sensors 85a to 85c installed on the upstream side of the heat medium flow switching devices 47a to 47c may be used, instead of the heat medium temperature sensor 83. Specifically, in Embodiment 3, the example where only the indoor unit 2a is performing a cooling operation is described. However, in the case where there are two or more indoor units that are performing a cooling operation out of the indoor units 2a, 2b, and 2c, the average value of the detected temperatures detected by the two or more heat medium temperature sensors among 85a, 85b, and 85c that correspond to the indoor units that are performing a cooling operation among the indoor units 2a, 2b, and 2c, may be used. Thus, it is possible to surely make a determination that the temperature of a heat medium in a cooling circulation circuit has increased.

In Embodiment 3, an example of the state in which the indoor unit 2a is performing a cooling operation while the indoor units 2b and 2c are performing a heating operation is described. However, obviously, the state is not limited to this.

(Effects of Embodiment 3)

As described above, a temperature rise effect of the heat medium in the cooling circulation circuit is obtained not only through effects of the heat exchange by the use-side heat exchanger of the indoor unit that is performing a cooling operation but also by mixing a high-temperature heat medium from the heating circulation circuit into the cooling circulation circuit. Thus, the heat medium temperature rise control may be completed quickly.

In Embodiment 3, in the case where the heat medium temperature rise control is performed, in the heating circulation circuit, the heat medium in the cooling circulation circuit is mixed at the upstream side before the heat medium is heated at the second intermediate heat exchanger 31. Therefore, the heat medium temperature is lower than the normal heat medium temperature on the inflow side of the second intermediate heat exchanger 31. Thus, in the case where the heat medium temperature rise control is performed, a heat exchange amount may increase compared to the normal case in the second intermediate heat exchanger 31, thereby reducing the decrease in the heat medium temperature on the outflow side of the second intermediate heat exchanger 31. For example, in the case where the indoor units 2a and 2b are performing a heating operation, it is possible to reduce the decrease in the heat medium temperature flowing in the indoor units 2a and 2b even if the heat medium temperature rise control is performed. Thus, a decrease in the air outlet temperature of the Indoor units 2a and 2b may be prevented, thereby mitigating the discomfort for users.

INDUSTRIAL APPLICABILITY

Examples of application of the present invention include an air-conditioning apparatus which allows the heat medium to circulate in an indoor unit. Alternatively, the present invention is applicable to a chiller that produces hot water and cold water.

REFERENCE SIGNS LIST

1: outdoor unit, 2 and 2a-2c: indoor unit, 3: rely unit, 4: high-pressure pipe, 5: low-pressure pipe, 6a-6c and 7a-7c: heat medium pipe, 11: compressor, 12: four-way valve, 13: heat-source-side heat exchanger, 14: accumulator, 15a-15d: check valve, 31: second intermediate heat exchanger, 32: expansion device, 33: first intermediate heat exchanger, 35: bypass device, 35a-35c: use-side heat exchanger, 36: bypass pipe, 41: second pump, 42: first pump, 45a-45c: heat medium flow control device, 46a-46c and 47a-47c: heat medium flow switching device, 50-53: heat medium flow passage, 55: heat medium branching part, 56: heat medium merging part, 57: heat medium branching part, 58: heat medium merging part, 71, 72, and 73: refrigerant pressure sensor, 75-77: refrigerant temperature sensor, 81-83 and 85a-85c: heat medium temperature sensor, 86a-86c: suction air temperature sensor, 101 and 102a-102c: fan, 201 and 202: controller

The invention claimed is:

1. An air-conditioning apparatus comprising:
a refrigeration cycle configured by connecting, by a refrigerant pipe, a compressor which compresses a heat-source-side refrigerant, a first intermediate heat exchanger which performs heat exchange between the heat-source-side refrigerant and a heat medium to cool the heat medium, an expansion device which decompresses the heat-source-side refrigerant, and a heat-source-side heat exchanger which performs heat exchange between outside air and the heat-source-side refrigerant, the refrigeration cycle including a bypass pipe for allowing part of or the entire heat-source-side refrigerant that is to flow in the first intermediate heat exchanger to perform bypassing, and a bypass device which is provided at the bypass pipe and which adjusts a flow rate of the heat-source-side refrigerant that performs bypassing;
a heat medium circuit configured by connecting, by a heat medium pipe, a first pump which pressure-feeds the heat medium which has been cooled by the first intermediate heat exchanger, a use-side heat exchanger which performs heat exchange between the heat medium and air in an air-conditioned space, and the first intermediate heat exchanger;
a refrigerant temperature detection device configured to detect a temperature of the heat-source-side refrigerant flowing into the first intermediate heat exchanger;
first temperature detection device configured to detect a temperature of the heat medium circulating in the first intermediate heat exchanger; and
a controller configured to adjust opening degrees of the expansion device and the bypass device,
wherein, responsive to a case where the controller determines that the temperature of the heat-source-side refrigerant detected by the refrigerant temperature detection device has become lower than a predetermined refrigerant temperature:
the bypass device is adjusted to open the opening degree thereof by the controller and the expansion device is also adjusted to close the opening degree thereof by the controller, and
the first pump pressure-feeds the heat medium so that the use-side heat exchanger exchanges heat between the heat medium and the air in the air-conditioned space.

2. The air-conditioning apparatus of claim 1, further comprising:
a heat medium flow control device provided within the heat medium circuit and configured to adjust a flow rate of the heat medium flowing into the use-side heat exchanger, wherein the controller, in a heat medium temperature rise control, by adjusting an opening degree of the heat medium flow control device to adjust the flow rate of the heat medium flowing into the use-side heat exchanger, raises the temperature of the heat medium.

3. The air-conditioning apparatus of claim 2, wherein the controller, in the heat medium temperature rise control, increases the opening degree of the heat medium flow control device such that the flow rate of the heat medium flowing into the use-side heat exchanger becomes greater than the flow rate before commencing the heat medium temperature rise control.

4. The air-conditioning apparatus of claim 3, further comprising:
a suction air temperature detection device configured to detect a suction air temperature of the use-side heat exchanger,
wherein the controller, based on the suction air temperature detected by the suction air temperature detection device, increases the opening degree of the heat medium flow control device in a stepwise or continuous manner to increase the flow rate of the use-side heat exchanger.

5. The air-conditioning apparatus of claim 2, further comprising
a second temperature detection device configured to detect a temperature of the heat medium flowing in the heat medium flow control device,
wherein, in the case where the controller determines that the temperature of the heat-source-side refrigerant detected by the refrigerant temperature detection device has become lower than the predetermined refrigerant temperature, the controller further:
stores (a) the opening degree of the expansion device before adjusting the expansion device to close the opening degree thereof, and (b) the opening degree of the bypass device before adjusting the bypass device to open the opening degree thereof,
controls the first pump to maintain the pressure-feed of the heat medium for at least a predetermined time until the temperature of the heat-source-side refrigerant becomes not higher than a predetermined heat medium temperature,
responsive to the temperature of the heat-source-side refrigerant becoming not higher than the predetermined heat medium temperature, controls (a) the opening degree of the expansion device to become the stored opening degree of the expansion device, and (b) the opening degree of the bypass device to become the stored opening degree of the bypass device, which were stored before changing the opening degree.

6. The air-conditioning apparatus of claim 5,
wherein the controller determines the predetermined refrigerant temperature among one of a plurality of predetermined freezing refrigerant temperatures, based on the temperature of the heat-source-side refrigerant, wherein the temperature of the heat-source-side refrigerant represents a flow-passage wall-surface temperature of the heat medium pipe.

7. The air-conditioning apparatus of claim 1, further comprising:
a second intermediate heat exchanger configured to heat exchange between the heat-source-side refrigerant and the heat medium to heat the heat medium; and
a second pump configured to pressure-feed the heat medium which has been heated by the second intermediate heat exchanger,
wherein the use-side heat exchanger includes a plurality of use-side heat exchangers,
wherein the heat medium circuit includes
a cooling circulation circuit in which the heat medium which has been cooled by the first intermediate heat exchanger is pressure-fed to part of the plurality of use-side heat exchangers by the first pump, and a cooling operation is performed at the part of the plurality of use-side heat exchangers,
a heating circulation circuit in which the heat medium which has been heated by the second intermediate heat exchanger is pressure-fed to part of the plurality of use-side heat exchangers by the second pump, and a heating operation is performed at the part of the plurality of use-side heat exchangers, and
a mixing device configured to mix a heated heat medium flowing in the heating circulation circuit with a cooled heat medium flowing in the cooling circulation circuit, and
wherein the controller, in a heat medium temperature rise control, causes the mixing device to mix at least part of the heated heat medium flowing in the heating circulation circuit with the heat medium flowing in the cooling circulation circuit.

8. The air-conditioning apparatus of claim 7,
wherein the mixing device includes heat medium flow switching devices corresponding to the plurality of use-side heat exchangers, and the heat medium flow switching devices each include one inflow-side part into which the heat medium flows in and two outflow-side parts from which the heat medium flows out, and are capable of continuously changing a ratio of the flow rates of the heat medium flowing out of the two outflow-side parts with a specific opening degree,
wherein the inflow-side part is connected to an outflow side of the heat medium of the corresponding use-side heat exchanger,
wherein one of the outflow-side parts is connected to an inflow side of the heat medium of the first intermediate heat exchanger,
wherein the other one of the outflow-side parts is connected to an inflow side of the heat medium of the second intermediate heat exchanger, and
wherein the controller, in the heat medium temperature rise control, by adjusting an opening degree of a heat medium flow switching device corresponding to a use-side heat exchanger that is performing the heating operation, mixes part of the heat medium flowing from the use-side heat exchanger that is performing the heating operation toward the second intermediate heat exchanger with the heat medium flowing into the first intermediate heat exchanger.

9. The air-conditioning apparatus of claim 8, further comprising
a second temperature detection device configured to detect a temperature of the heat medium flowing in a heat medium flow control device,
wherein the controller calculates a mixing ratio of the flow rate of the heat medium flowing into the second intermediate heat exchanger to the flow rate of the heat medium flowing into the first intermediate heat exchanger on the basis of the temperature of the heat medium flowing in the heat medium flow control device corresponding to the use-side heat exchanger that is performing the heating operation, the temperature being detected by the second temperature detection device, the temperature of the heat medium detected by the first temperature detection device, and a predetermined heat medium temperature.

10. The air-conditioning apparatus of claim 9, wherein the controller
calculates a total cooling capacity value, which is a total value of cooling capacity of the use-side heat exchanger that is performing the cooling operation,
calculates a total heating capacity value, which is a total value of heating capacity of the use-side heat exchanger that is performing the heating operation,
calculates the opening degree of the heat medium flow switching device corresponding to the use-side heat exchanger that is performing the cooling operation, on the basis of the mixing ratio, and
calculates the opening degree of the heat medium flow switching device corresponding to the use-side heat exchanger that is performing the heating operation, on the basis of the mixing ratio, the cooling capacity total value, and the heating capacity total value.

11. The air-conditioning apparatus of claim 1, wherein the controller sets a lower predetermined refrigerant temperature when the first temperature detection device detects a higher heat medium temperature.

12. The air-conditioning apparatus of claim 1, wherein the controller, in a heat medium temperature rise control, increases the rotation speed of the first pump, compared to the rotation speed before commencing the heat medium temperature rise control.

13. The air-conditioning apparatus of claim 1, wherein the controller,
at a start of a freeze prevention control, adjusts the opening degree of the bypass device and then adjusts the opening degree of the expansion device, and
after completing the freeze prevention control, resets the opening degree of the expansion device to an original opening degree and then resets the opening degree of the bypass device to an original opening degree.

14. The air-conditioning apparatus of claim 1, further comprising
a fan which sends air to the use-side heat exchanger,
wherein the controller, in a heat medium temperature rise control, causes the fan for the use-side heat exchanger to operate.

15. The air-conditioning apparatus of claim 1, wherein the heat medium is water.

16. The air-conditioning apparatus of claim 1, wherein the controller, in a heat medium temperature rise control, raises the temperature of the cooled heat medium so that the temperature of the heat medium detected by the first temperature detection device becomes a predetermined heat medium temperature serving as a target temperature.

17. The air-conditioning apparatus of claim 16, wherein the controller, in the heat medium temperature rise control, in a case where the heat medium temperature detected by the first temperature detection device exceeds the predetermined heat medium temperature, completes the heat medium temperature rise control.

18. The air-conditioning apparatus of claim 1,
wherein the controller determines the predetermined refrigerant temperature among one of a plurality of predetermined freezing refrigerant temperatures, based on the temperature of the heat-source-side refrigerant, wherein the temperature of the heat-source-side refrigerant represents a flow-passage wall-surface temperature of the heat medium pipe.

* * * * *